(12) United States Patent
Abiru

(10) Patent No.: US 6,671,601 B2
(45) Date of Patent: *Dec. 30, 2003

(54) CONTINUOUSLY VARIABLE TRANSMISSION CONTROLLER

(75) Inventor: Yuuki Abiru, Tokyo-To (JP)

(73) Assignee: Fuji Jukogyo Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 52 days.

(21) Appl. No.: 09/212,468

(22) Filed: Dec. 16, 1998

(65) Prior Publication Data

US 2002/0062186 A1 May 23, 2002

(30) Foreign Application Priority Data

Dec. 18, 1997 (JP) .............................. 9-349571

(51) Int. Cl.$^7$ .......................... G06F 17/00; G06F 19/00; B60K 41/04; B60K 41/12
(52) U.S. Cl. ........................... 701/51; 701/55; 701/56; 701/64; 701/65; 477/37; 477/43; 477/107; 477/108; 477/109; 477/110
(58) Field of Search ............................. 701/55, 56, 64, 701/65, 51; 477/37, 43, 107, 108, 109, 110

(56) References Cited

U.S. PATENT DOCUMENTS

| | | | | |
|---|---|---|---|---|
| 4,338,666 A | * | 7/1982 | Suzuki et al. ................... 701/56 |
| 4,589,071 A | * | 5/1986 | Yamamuro et al. ............ 701/55 |
| 4,720,793 A | * | 1/1988 | Watanabe et al. .............. 477/43 |
| 5,007,147 A | * | 4/1991 | Imai et al. ...................... 74/866 |
| 5,035,160 A | * | 7/1991 | Morita ........................... 74/866 |
| 5,231,897 A | * | 8/1993 | Morita ........................... 74/866 |
| 5,323,318 A | * | 6/1994 | Hasegawa et al. ............. 701/57 |
| 5,361,207 A | * | 11/1994 | Hayafine ....................... 701/57 |
| 5,389,050 A | * | 2/1995 | Sakai et al. .................... 477/78 |
| 5,455,767 A | * | 10/1995 | Staerker ...................... 192/222 |
| 6,029,107 A | * | 2/2000 | Sato ............................ 477/120 |
| 6,085,139 A | * | 7/2000 | Nakauchi et al. .............. 477/97 |

FOREIGN PATENT DOCUMENTS

| | | |
|---|---|---|
| JP | 81931/1994 | 3/1994 |
| JP | 81932/1994 | 3/1994 |
| JP | 68448/1996 | 3/1996 |

* cited by examiner

Primary Examiner—William A. Cuchlinski, Jr.
Assistant Examiner—Brian J Broadhead
(74) Attorney, Agent, or Firm—Smith, Gambrell & Russell LLP

(57) ABSTRACT

A decision is made as to whether a vehicle is traveling in an uphill traveling mode or in a downhill traveling mode with reference to an incremental running resistance ΔR determined on the basis of a running resistance that will act on the vehicle while the vehicle is traveling in a flat road traveling mode. A desired traction $F_d$ for a full-open throttle state in which a throttle valve is fully open is set if the vehicle is in the uphill traveling mode by using the incremental running resistance ΔR, and a desired traction $F_d$ for a full-closed throttle state in which the throttle valve is fully closed is set if the vehicle is in the downhill traveling mode by using the incremental running resistance ΔR. The desired traction $F_d$ and an achieved traction F(t) in the full-open throttle state at a present traveling speed V are compared if the vehicle is in the uphill traveling mode. The desired traction $F_d$ and an achieved traction F(t) in the full-closed throttle state at a present traveling speed V are compared if the vehicle is in the downhill traveling mode. A speed change ratio correction Δr is set to adjust the achieved traction F(t) to the desired traction $F_d$. Data on desired primary pulley speed NP stored in a basic speed change characteristic map is shifted by the speed change ratio correction Δr toward a downshift side for correction, and a desired speed change ratio $i_s$ is set on the basis of the corrected data on desired primary pulley speed NP.

32 Claims, 14 Drawing Sheets

CONTINUOUSLY VARIABLE TRANSMISSION CONTROLLER

BACKGROUND OF THE INVENTION

1. Field of the Invention

The present invention relates to a continuously variable transmission controller (hereinafter referred to as "CVT controller") capable of controlling a continuously-variable transmission (hereinafter abbreviated to "CVT") for appropriate downshift operation while a vehicle mounted with the CVT is in an uphill traveling mode or in a downhill traveling mode.

2. Description of the Related Art

A conventional CVT controller for controlling a CVT determines a speed change ratio on the basis of throttle opening, and a parameter indicating an operating condition, such as a traveling speed or an engine speed, and determines a desired primary pulley speed by making reference to a basic speed change characteristic map, and varies the speed change ratio of the CVT continuously in the range of a low speed change ratio to an overdrive speed change ratio in a follow-up control mode so that actual primary pulley speed approaches the desired primary pulley speed.

In most cases, the basic speed change characteristic map is produced empirically on the basis of experimental results so that the vehicle loaded with a standard load is able to travel properly on a horizontal and flat road. Accordingly, if the speed change ratio is determined on the basis of such a basic speed change characteristic map, the torque of the driving system of the vehicle may be insufficient and the driver will feel an unpleasant feeling while the vehicle is in the uphill traveling mode, and an appropriate effect of engine brake is unavailable and the driver will feel unpleasant.

A technique disclosed in JP-A No. 6-81931 or 6-81932 subtracts running resistance including air resistance, acceleration resistance, rolling resistance and cornering resistance from the traction of an engine, calculates weight incline resistance during uphill traveling, determines a desired primary pulley speed correction corresponding to the weight incline resistance and a throttle opening by making reference to a map, adds the desired primary pulley speed correction to a desired primary pulley speed corresponding to the throttle opening and a traveling speed determined by making reference to a basic speed change characteristic map to correct the desired primary pulley speed.

If an estimated running resistance is excessively high and the traction is increased by an incremental traction corresponding to an excess running resistance over an expected running resistance, the CVT will be downshifted by an excessively large downshift amount and the engine speed will excessively be increased. A technique disclosed in JP-A No. 8-68448 decreases the rate of increase of an amount corresponding to a downshift amount (incline resistance, desired primary pulley speed) with the increase of incline resistance or throttle opening or sets an upper limit to the downshift amount to reduce an unpleasant sensation that may be felt by the driver.

However, if an incremental running resistance is compensated by downshift while the vehicle is traveling at a high traveling speed, downshift will increase engine speed greatly even if the incremental running resistance is small. Accordingly, the engine needs to operate at a high engine speed and noise and fuel consumption increase in a high traveling speed range. In a state where the vehicle is traveling at a small throttle opening, the output torque of the engine declines as engine speed increases, increase in traction exceeding a predetermined value cannot be expected from downshift and traction has a declining tendency, deceleration due to downshift will give an unpleasant feeling to the driver.

SUMMARY OF THE INVENTION

Accordingly, it is an object of the present invention to provide a CVT controller for controlling the shifting operation of a CVT, capable of properly determining a downshift amount by which the CVT is to be downshifted for the uphill or downhill traveling of a vehicle, of preventing excessive increase in engine speed, of suppressing increase in vibrations and noise, and of improving the maneuverability of the vehicle.

According to one aspect of the present invention, a CVT controller for controlling a CVT mounted on a vehicle comprises: an incremental running resistance setting means for setting an incremental running resistance based on a running resistance that will act on the vehicle when the vehicle is traveling in a flat road traveling mode on a horizontal, flat road according to traveling mode; a desired traction setting means for deciding whether the vehicle is in an uphill traveling mode or in a downhill traveling mode on the basis of the incremental running resistance, setting a desired traction for a full-open throttle state where a throttle valve is fully open on the basis of the incremental running resistance if the vehicle is in the uphill traveling mode and setting a desired traction for a fill-closed throttle state where the throttle valve is fully closed on the basis of the incremental running resistance if the vehicle is in the downhill traveling mode; a correction setting means for comparing the desired traction and an achieved traction in the full-open throttle state at a present traveling speed if the vehicle is in the uphill traveling mode, comparing the desired traction and an achieved traction in the fill-closed throttle state at a present traveling speed if the vehicle is in the downhill traveling mode, and determining a correction for adjusting the achieved traction to the desired traction; a speed change characteristic correcting means for correcting a basic speed change characteristic stored in a basic speed change characteristic map toward a downshift side; and a desired speed change ratio setting means for setting a desired speed on the basis of the corrected basic speed change characteristic.

The desired traction and an achieved traction in the full-open throttle state at a present traveling speed are compared if the vehicle is in the uphill traveling mode, the desired traction and an achieved traction in the full-closed throttle state at a present traveling speed are compared if the vehicle is in the downhill traveling mode, and a correction for adjusting the achieved traction to the desired traction is determined. A basic speed change characteristic stored in a basic speed change characteristic map is corrected toward a downshift side and a desired speed is set on the basis of the corrected basic speed change characteristic. Therefore, the speed change ratio can automatically be shifted by an appropriate amount of downshift according to the incremental running resistance based on the running resistance that may act on the vehicle while the vehicle is in the flat road traveling mode, the speed change ratio can properly be shifted toward the downshift side in the uphill traveling and the downhill traveling mode, excessive rise in engine speed due to inappropriate downshift can be avoided, and vibrations and noise can be suppressed. Since the speed change ratio is shifted toward the downshift side according to the increase of the incremental running resistance when the vehicle is in the uphill traveling mode, control input to the throttle valve (accelerator pedal) can be reduced. Since the speed change ratio is shifted toward the downshift side according to the reduction of the incremental running resistance when the vehicle is in the downhill traveling mode, operation necessary for using engine brake for downhill traveling can be simplified and hence the operation of the vehicle is improved greatly. Accordingly, the frequency of setting the engine for an accelerating mode during uphill traveling is reduced, and the frequency of fuel injection control operations for an accelerating mode can be reduced. Since the basic speed change characteristic is shifted toward the downshift side when the vehicle is in the downhill traveling mode to maintain the lowest speed change line on a high level to improve fuel consumption, a fuel cut region during downhill traveling can be expanded and, consequently, fuel consumption is improved. Since the lowest speed change line is held on a high level, the frequency of speed change ratio variation due to frequent operations for alternate stepping on and releasing the accelerator pedal (busy shift) can be reduced and the unpleasant sensation due to upshift resulting from the release of the accelerator pedal can be reduced.

In the CVT controller, the speed change characteristic correcting means may set a desired primary pulley speed for the flat road traveling mode by making reference to the basic speed change characteristic map and may correct the desired primary pulley speed by the correction toward a downshift side, and the desired speed change ratio setting means may set a desired speed on the basis of the corrected desired primary pulley speed. Thus, a desired primary pulley speed is set on the basis of the traveling mode for the flat road traveling mode by making reference to the basic speed change characteristic map, the desired primary pulley speed is corrected by the correction toward a downshift side to correct the speed change characteristic, a desired speed is set on the basis of the corrected desired primary pulley speed, and the present invention can readily applied to the conventional CVT controller.

The CVT controller may further comprise a correction coefficient setting means for setting a correction coefficient for the weighted correction of the incremental running resistance on the basis of traveling speed to reduce the incremental running resistance according to the increase of traveling speed when a present traveling speed is in a range not lower than a predetermined traveling speed, and the desired traction setting means may set the desired traction on the basis of a corrected incremental running resistance determined by correcting the incremental running resistance by using the correction coefficient. A correction coefficient is set for the weighted correction of the incremental running resistance on the basis of traveling speed to reduce the incremental running resistance according to the increase of traveling speed when a present traveling speed is in a range not lower than a predetermined traveling speed. The desired traction is set on the basis of a corrected incremental running resistance determined by correcting the incremental running resistance by using the correction coefficient. Therefore, the amount of downshift can be reduced, excessive rise in engine speed can be suppressed, vibrations and noise can be reduced and fuel consumption can be improved while the vehicle is traveling at traveling speeds in a high traveling speed range.

The CVT controller may further comprise a correction coefficient setting means for setting a correction coefficient for the weighted correction of the incremental running resistance on the basis of traveling speed to reduce the incremental running resistance according to the increase of traveling speed when a present traveling speed is in a range not lower than a predetermined traveling speed, the correction setting means may correct the correction by using the correction coefficient, and the speed change characteristic correcting means may correct the basic speed change characteristic stored in the basic speed change characteristic map by using the corrected correction toward a downshift side. A correction coefficient is set for the weighted correction of the incremental running resistance on the basis of traveling speed to reduce the incremental running resistance according to the increase of traveling speed when a present traveling speed is in a range not lower than a predetermined traveling speed. The correction is corrected by using the correction coefficient, and the basic speed change characteristic stored in the basic speed change characteristic map is corrected by using the corrected correction toward a downshift side. Therefore, the amount of downshift can be reduced, excessive rise in engine speed can be suppressed, vibrations and noise can be reduced and fuel consumption can be improved while the vehicle is traveling at traveling speeds in a high traveling speed range.

The CVT controller may further comprise a correction coefficient setting means for setting a correction coefficient for the weighted correction of the incremental running resistance on the basis of traveling speed to reduce the incremental running resistance according to the increase of traveling speed when a present traveling speed is in a range not lower than a predetermined traveling speed, the correction setting means may correct the correction by using the correction coefficient to provide a corrected correction, and the speed change characteristic correcting means may correct the desired primary pulley speed for the flat road traveling mode set by making reference to the basic speed change characteristic map on the basis of a traveling mode toward a downshift side by using the corrected correction. A correction coefficient is set for the weighted correction of the desired primary pulley speed on the basis of traveling speed to reduce the desired primary pulley speed according to the increase of traveling speed when a present traveling speed is in a range not lower than a predetermined traveling speed. The correction is corrected by using the correction coefficient to provide a corrected correction. The desired primary pulley speed for flat road traveling set by making reference to the basic speed change characteristic map on the basis of a traveling mode is corrected toward a downshift side by using the corrected correction. Therefore, the amount of downshift can be reduced, excessive rise in engine speed can be suppressed, vibrations and noise can be reduced and fuel consumption can be improved while the vehicle is traveling at traveling speeds in a high traveling speed range.

In the CVT controller, the incremental running resistance setting means may stop an operation for setting the incremental running resistance if brakes are being applied and may hold an incremental running resistance set in the preceding incremental running resistance setting cycle. An operation for setting the incremental running resistance is stopped if brakes are being applied and an incremental running resistance set in the preceding incremental running resistance setting cycle is held. Therefore, the introduction of errors in the calculated incremental running resistance due to the influence of deceleration can be prevented, and the incremental running resistance can accurately be calculated to enhance the reliability of the downshift correction of the speed change ratio.

In the CVT controller, the correction coefficient setting means may set the correction when the vehicle is traveling at a traveling speed in a traveling speed range excluding very low traveling speeds and high traveling speeds. The correction is set when the vehicle is traveling at a traveling speed in a traveling speed range excluding very low traveling speeds and high traveling speeds. Therefore, unnecessary operations for downshift correction in the very low traveling speed range and the high traveling speed range not requiring the downshift correction of the speed change ratio can be avoided.

In the CVT controller, the correction setting means may hold a correction set in the preceding correction setting cycle if an incremental traction increased after the downshift correction of traction is small as compared with the traction for uphill traveling. A correction set in the preceding correction setting cycle is held if an incremental traction increased after the downshift correction of traction is small as compared with the traction for uphill traveling to avoid unnecessary downshift. Therefore, the correction determined in the preceding cycle is held to avoid unnecessary downshift operations when increase in traction by increasing the amount of downshift while the vehicle is in the uphill traveling mode cannot be expected and hence an unpleasant sensation to the driver due to insufficient output power of the engine can be reduced.

In the CVT controller, the correction setting means may hold a correction set in the preceding correction setting cycle if a decremental traction decreased after the downshift correction of traction is small as compared with the traction for downhill traveling. A correction set in the preceding correction setting cycle is held if a decremental traction decreased after the downshift correction of traction is small as compared with the traction for downhill traveling to avoid unnecessary downshift. Therefore, the correction determined in the preceding cycle is held to avoid unnecessary downshift operations when increase in engine brake force by increasing the amount of downshift while the vehicle is in the downhill traveling mode cannot be expected and hence an unpleasant sensation to the driver due to insufficient engine brake force and such can be reduced.

In the CVT controller, the correction setting means may hold a correction set in the preceding correction setting cycle if the value of a parameter indicating load on the engine during uphill traveling is less than a predetermined value. It is decided that the driver has no intention of accelerating the vehicle if the value of a parameter indicating load on the engine during uphill traveling is less than a predetermined value, and a correction set in the preceding correction setting cycle is held. Therefore, unnecessary downshift operation when the driver has not intention of accelerating the vehicle while the vehicle is in the uphill traveling mode can be avoided to prevent giving an unpleasant sensation to the driver.

In the CVT controller, the correction setting means may hold a correction set in the preceding correction setting cycle if the value of a parameter indicating load on the engine during downhill traveling is not smaller than a predetermined value. It is decided that the driver has no intention of applying the brakes if the value of a parameter indicating load on the engine during downhill traveling is not smaller than a predetermined value, and a correction set in the preceding correction setting cycle is held. Therefore, unnecessary downshift operation when the driver has not intention of using engine brake while the vehicle is in the downhill traveling mode can be avoided to prevent giving an unpleasant sensation to the driver.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

A CVT controller in a first embodiment according to the present invention will be described with reference to FIGS. 1 to 11. An automotive driving system including a CVT for a vehicle will be described with reference to FIG. 2 prior to the description of the CVT controller.

Figure 1:
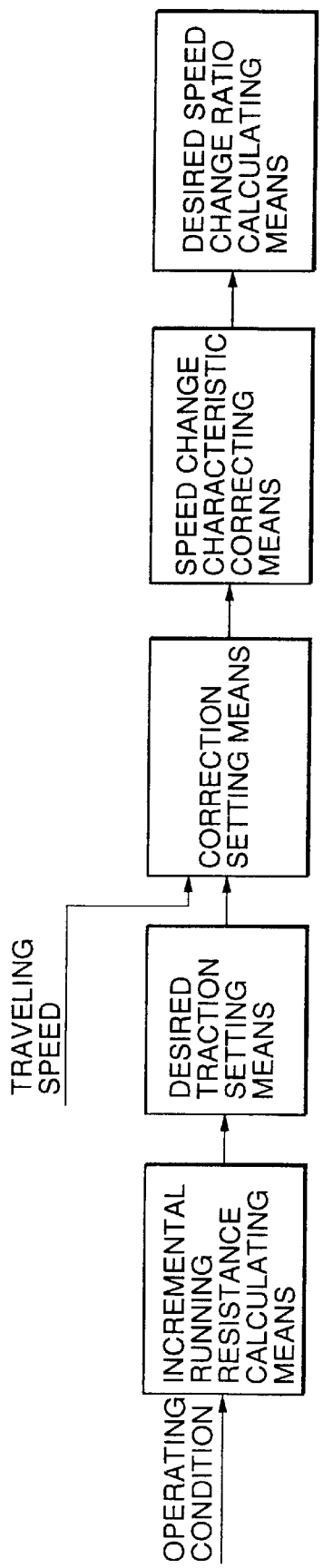
FIG. 1 is as block diagram showing the basic configuration of a CVT controller according to the present invention.
Figure 2:
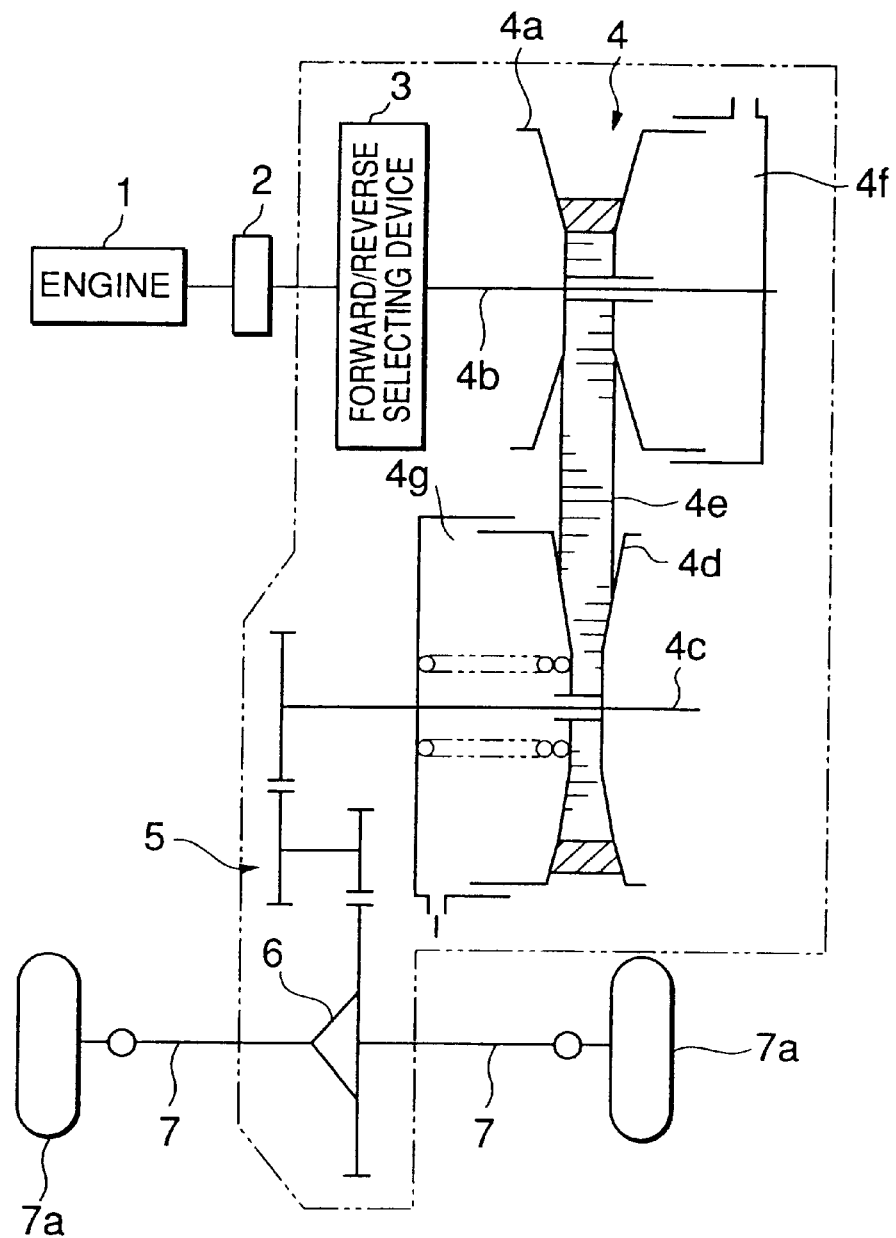
FIG. 2 is a diagrammatic view of an automotive driving system including a CVT to be controlled by a CVT controller in a first embodiment according to the present invention.

Referring to FIG. 2, an engine 1 has an output shaft connected through a starting clutch, such as an electromagnetic clutch 2 or a torque converter, to a forward/reverse selecting device 3. A CVT 4 comprises an input shaft $4b$, a primary pulley $4a$ mounted on the input shaft $4b$, an output shaft $4c$ parallel to the input shaft $4b$, a secondary pulley $4d$ mounted on the output shaft $4c$, and a drive belt $4e$ wound around the primary pulley $4a$ and the secondary pulley $4d$. The forward/reverse selecting device 3 has an output shaft connected to the input shaft $4b$ of the CVT 4. The output shaft $4c$ of the CVT 4 is linked to a differential gear 6 by a gear train 5. Drive shafts 7 are connected to the differential gear 6, and drive wheels $7a$, i.e., front wheels or rear wheels, are mounted on the drive shafts 7, respectively. The speed change ratio of the CVT 4 is varied by changing the pitch diameter of the primary pulley $4a$ by supplying a working fluid of a primary pressure to a primary pressure chamber $4f$ combined with the primary pulley $4a$ to operate the primary pulley $4a$. The tension of the belt $4e$ is adjusted properly by supplying the working fluid of a secondary pressure to a secondary pressure chamber 4g combined with the secondary pulley 4d to enable torque transmission from the primary pulley 4a to the secondary pulley 4d. The primary pressure and the secondary pressure are adjusted according to the operating condition of the engine 1 by a CVT controller 21 in the first embodiment according to the present invention. The primary pressure and the secondary pressure are adjusted so that the respective effective groove widths of the primary pulley 4a and the secondary pulley 4d vary in inverse proportion to each other.

Figure 3:
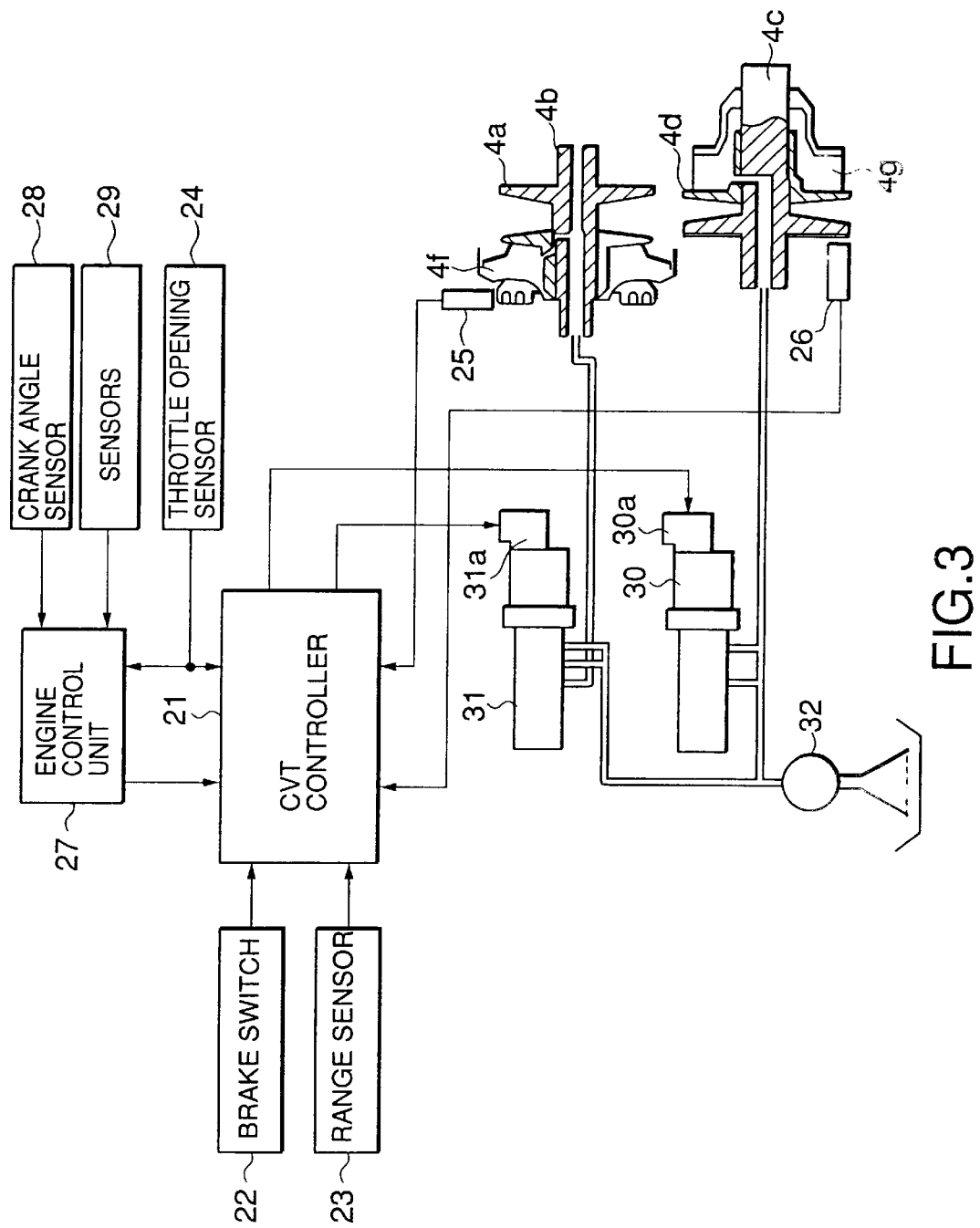
FIG. 3 is diagrammatic view of a control system for controlling the CVT shown in FIG. 2.

Referring to FIG. 3, the CVT controller 21 comprises a computer or the like and has an input port connected to a brake switch 22 which is closed when a brake pedal is depressed, a range sensor 23 for measuring a position where a range selector lever is set, a throttle opening sensor 24, a primary pulley speed sensor 25 for measuring the rotating speed of the primary pulley 4a, a secondary pulley speed sensor 26 for measuring the rotating speed of the secondary pulley 4d, and an engine control unit 27. The CVT controller 21 receives engine speed data calculated on the basis of the output signal of a crank angle sensor 28 and calculated data calculated on the basis of output signals of necessary sensors 29 from the engine control unit 27. The CVT controller 21 has an output port connected to a proportional solenoid actuator 30a for operating a line pressure control valve 30, and a proportional solenoid actuator 31a for operating a speed change control valve 31. An oil pump 32 driven by the engine 1 is connected to a hydraulic circuit including the line pressure control valve 30 and the speed change control valve 31. The line pressure control valve 30 adjusts the discharge pressure of the oil pump 32 to a line pressure PL corresponding to a speed change ratio. The line pressure PL is supplied to the secondary pressure chamber 4b to apply the secondary pressure to the secondary pressure chamber 4b. The speed change control valve 31 receives the line pressure PL as an input pressure and produces a primary pressure $P_p$ to be applied to the primary pressure chamber 4f.

Figure 4:
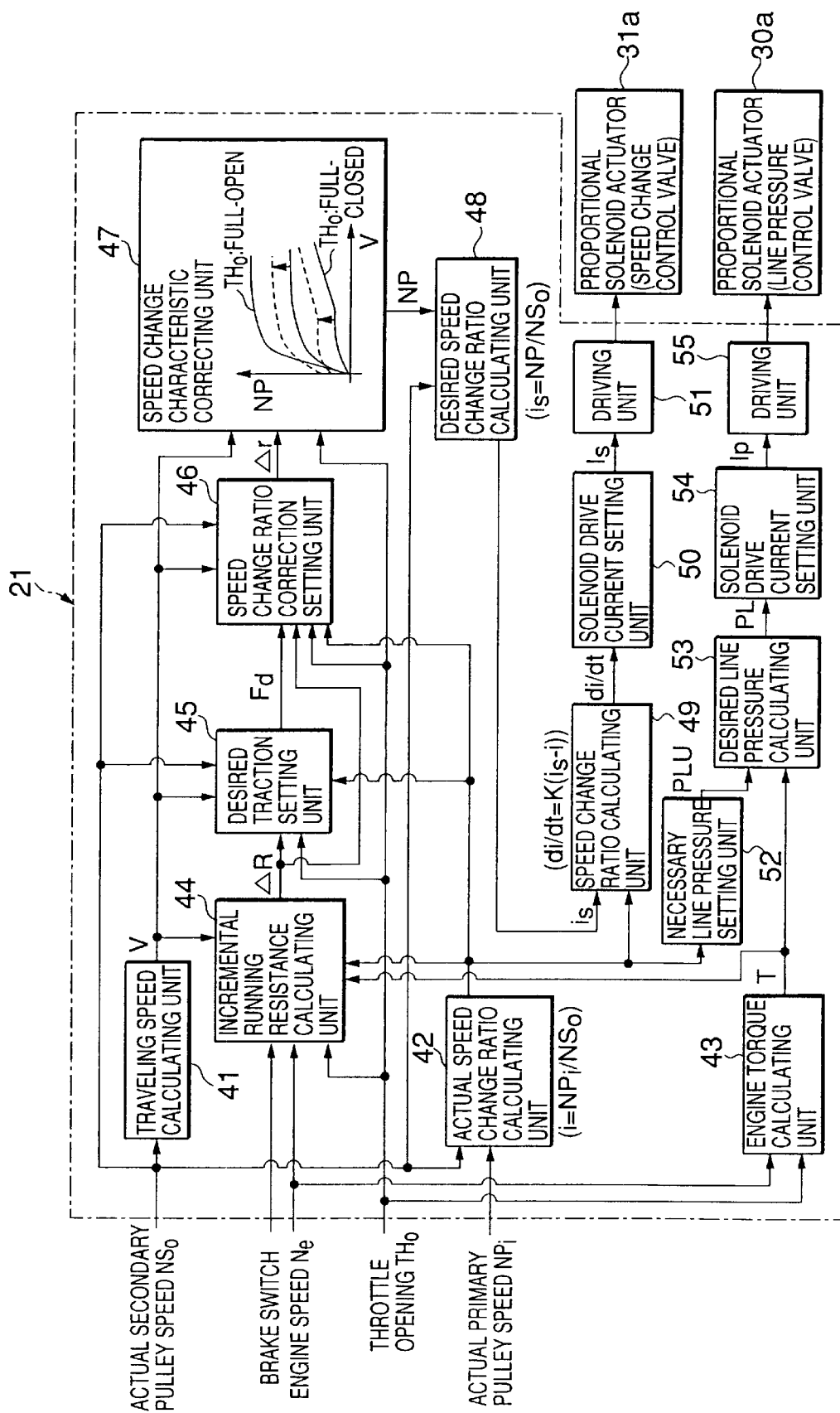
FIG. 4 is a block diagram of the CVT controller in the first embodiment.
Figure 5:
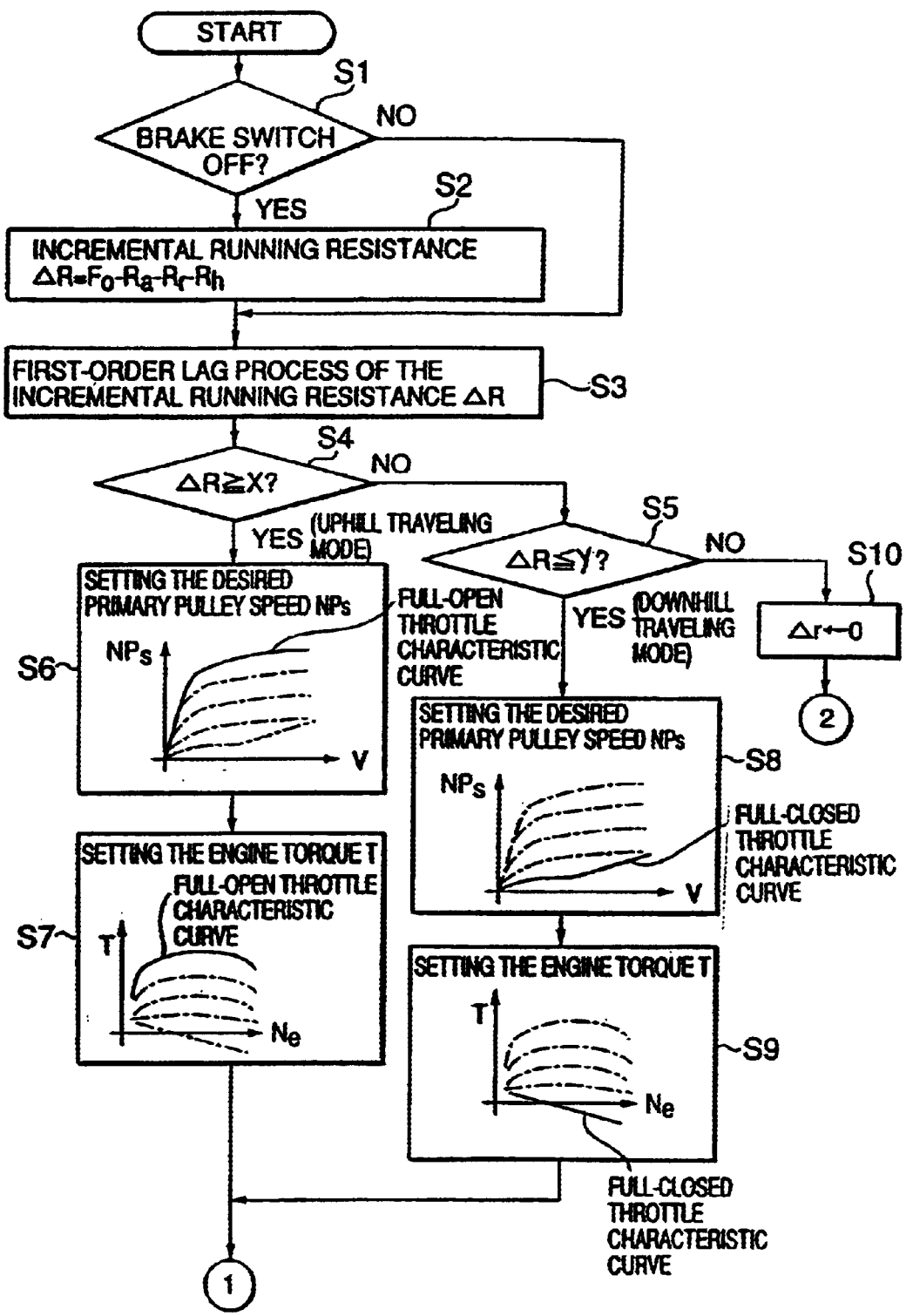
FIG. 5 is flow chart of a part of a speed change characteristic correcting routine to be executed by the CVT controller shown in FIG. 4.

The functional configuration of the CVT controller 21 will be described with reference to FIG. 4. The CVT controller 21 has a speed change control system for controlling the operating stroke of the proportional solenoid actuator 31a combined with the speed change control valve 31, and a line pressure control system for controlling the operating stroke of the proportional solenoid actuator 30a combined with the line pressure control valve 30. The speed change control system comprises a traveling speed calculating unit 41, an actual speed change ratio calculating unit 42, an engine torque calculating unit 43, an incremental running resistance calculating unit 44, a desired traction setting unit 45, a speed change ratio correction setting unit 46, a speed change characteristic correcting unit 47, a desired speed change ratio calculating unit 48, a speed change rate calculating unit 49, a solenoid drive current setting unit 50 and a driving unit 51. The line pressure control system comprises a necessary line pressure setting unit 52, a desired line pressure calculating unit 53, a solenoid drive current setting unit 54 and a driving unit 55.

The speed change control system calculates an incremental running resistance ΔR on the basis of a running resistance that will act on the vehicle while the vehicle is traveling on a horizontal, flat road, calculates a desired traction $F_d$ for an uphill traveling mode or a downhill traveling mode by using the incremental running resistance ΔR, compares the desired traction $F_d$ with a traction F(t) available when the vehicle is in the uphill traveling mode at the present traveling speed with the engine 1 operating with the throttle valve fully open or when the vehicle is in the downhill traveling mode at the present traveling speed with the engine 1 operating with the throttle valve fully closed, sets a speed change ratio correction Δr for reducing the deviation, i.e., the difference between F(t) and $F_d$, to a value in a predetermined deviation range, corrects a desired primary pulley speed NP by using the speed change ratio correction Δr to set a desired speed change ratio $i_s$, i.e., a final basic speed change characteristic in the uphill traveling mode or the downhill traveling mode, and controls primary pressure $P_p$, applied to the primary pressure chamber 4f combined with the primary pulley 4a to make an actual speed change ratio i approach a desired speed change ratio $i_s$.

The traveling speed calculating unit 41 calculates a traveling speed V by using an actual secondary pulley speed $NS_o$ calculated on the basis of the output signal of the secondary pulley speed sensor 26, the gear ratio of the drive system excluding the CVT 4, and the effective diameter of the driving wheels 7a.

The actual speed change ratio calculating unit 42 calculates an actual speed change ratio $i=NP_i/NS_o$, i.e., the ratio of an actual primary pulley speed $NP_i$ calculated on the basis of the output signal of the primary pulley speed sensor 25 and the actual secondary pulley speed $NS_o$.

The engine torque calculating unit 43 reads an engine speed $N_e$ calculated by the engine control unit 27 on the basis of the output signal of the crank angle sensor 28, and determines an engine torque T by making reference to an engine torque map and executing interpolation with respect to the engine speed $N_e$ and a throttle opening $TH_o$.

The incremental running resistance calculating unit 44 determines an incremental running resistance ΔR, i.e., the difference between the traction $F_o$ of the driving wheels 7a and a running resistance R.

The desired traction setting unit 45 sets a desired traction $F_d$ that provides a margin of traction corresponding to the incremental running resistance ΔR in an uphill traveling mode in the full-open throttle state or sets a desired traction $F_d$ that enables the use of a braking force produced by engine brake and corresponding to the incremental running resistance ΔR in a downhill traveling mode in the full-closed throttle state in order that an excess traction corresponding to the incremental running resistance ΔR is available in the uphill traveling mode and the downhill traveling mode as well as in the flat road traveling mode.

The speed change ratio correction setting unit 46 sets a speed change ratio correction Δr for correcting a desired speed change ratio $i_s$ for the full-open throttle state or the full-closed throttle state to make an achieved traction F(t) in the full-open throttle state for uphill traveling at the present traveling speed V or in the full-closed throttle state for downhill traveling at the present traveling speed V fall in a predetermined range around the desired traction $F_d$.

The speed change characteristic correcting unit 47 shifts all desired primary pulley speeds NP stored as basic speed change characteristic data in a basic speed change characteristic map toward a downshift side by a value corresponding to the speed change ratio correction Δr. Thus the excess traction corresponding to the incremental running resistance ΔR can be produced for uphill traveling or an effective braking force of engine brake is available for downhill traveling by making reference to the basic speed change characteristic map and executing interpolation with respect to the traveling speed V and the throttle opening $TH_o$.

The desired speed change ratio calculating unit 48 calculates a desired speed change ratio $i_s=NP/NS_o$, i.e., the ratio of the desired primary pulley speed NP to the actual secondary pulley speed $NS_o$.

The speed change rate calculating unit 49 calculates a speed change rate di/dt at which an actual speed change ratio i is adjusted to the desired speed change ratio $i_s$ by using:

$$di/dt = K(i_s - i)$$

where K is a coefficient. The speed change rate di/dt is positive for upshift and is negative for downshift.

The solenoid drive current setting unit 50 sets a solenoid drive current $I_s$ corresponding to the speed change rate di/dt, i.e., a solenoid drive current $I_s$ for producing a primary pressure $P_p$ corresponding to the speed change rate di/dt.

The driving unit 51 supplies the solenoid current $I_s$ to the proportional solenoid actuator 31a, the proportional solenoid actuator 31a changes the sectional area of the passage of the speed change control valve 31 to apply the primary pressure $P_p$ corresponding to the speed change rate di/dt to the primary pressure chamber 4f.

The line pressure control system will be described hereinafter. The line pressure control system sets the line pressure PL, i.e., a secondary pressure to be applied to the secondary pressure chamber 4g combined with the secondary pulley 4d to apply a tensile force necessary for torque transmission.

The necessary line pressure setting unit 52 sets a necessary line pressure PLU for a unit torque on the basis of the actual speed change ratio i through table lookup or calculation.

The desired line pressure calculating unit 53 multiplies the necessary line pressure PLU by engine torque T to calculate a desired line pressure PLURALITY OF.

$$PL = PLU \times T$$

The solenoid drive current setting unit 54 determines a current $I_p$ corresponding to the desired line pressure PL and supplies the current $I_p$ to the solenoid actuator 30a combined with the line pressure control valve 30. Consequently, the sectional area of the passage of the line pressure control valve 30 is adjusted by the proportional solenoid actuator 30a to apply the line pressure PL equal to the desired line pressure PL is applied to the secondary pressure chamber 4g to apply a tensile force suitable for the operating condition is applied to the secondary pulley 4d. The line pressure control system carries out well-known operations as described in JP-A No. 7-317863 and hence the further description thereof will be omitted.

FIGS. 5 to 11 are flow charts of routines included in a speed change control procedure to be carried out by the CVT controller 21. A speed change characteristic correcting routine will be described with reference to FIGS. 5 to 8. The speed change characteristic correcting routine is executed at a predetermined period. In step S1, the output signal of the brake switch 22 is read and a decision is made as to whether or not the brakes are applied. If the brakes are taken off and the brake switch 22 is off, an incremental running resistance ΔR is calculated by using Expression (1.1) in step S2, and then the routine goes to step S3.

$$\Delta R = F_o - R_a - R_r - R_h \tag{1.1}$$

where ΔR is incremental running resistance corresponding to weight incline resistance that acts on the vehicle during uphill traveling or downhill traveling, $F_o$ is traction exerted by the driving wheels 7a (hereinafter referred to as "effective traction"), $R_a$ is air resistance, $R_r$ is rolling resistance and $R_h$ is acceleration resistance. The sum of the resistances $R_a$, $R_r$ and $R_h$ is the running resistance that acts on the vehicle.

Effective traction $F_o$ is calculated by:

$$F_o = T \times G_r / r \tag{1.2}$$

where $G_r$ is overall gear ratio, r is the radius of the driving wheels 7a.

$$G_r = i \times i_r \tag{1.3}$$

where i is the actual speed change ratio (=$NP_i/NS_o$) of the CVT 4, and $i_r$ is a constant equal to the gear ratio of the transmission system excluding the CVT 4 and including the reduction gear train 5 and the differential gear 6. Air resistance $R_a$ is calculated on the basis of drag coefficient and traveling speed, rolling resistance $R_r$ is a constant representing a resistance that will act on the vehicle when the vehicle travels on a pavement, acceleration resistance $R_h$ corresponds to the sum of body acceleration resistance based on traveling speed V, and revolution resistance calculated on the basis of the inertia moment of the power transmission system and angular velocity.

If it is decided in step S1 that the brake switch 22 is on and the brakes are applied (the brake pedal is depressed), an error appears in the incremental running resistance ΔR. Therefore, incremental running resistance ΔR is not calculated and an incremental running resistance ΔR calculated in the preceding cycle is held and the routine jumps to step S3.

In step S3, the incremental running resistance ΔR is subjected to a first-order lag process to prevent the hunting of the incremental running resistance ΔR due to the variation of the output signals of the sensors attributable to the collision between the teeth of gears of the transmission system, the variation of the surface condition of the road, the variation of engine speed and such. The incremental running resistance ΔR is compared with an uphill criterion X ($\geq 0$) in step S4 and with a downhill criterion Y ($\leq 0$) in step S5.

If the vehicle is in the uphill traveling mode and ΔR $\geq 0$, the routine goes to step S6.

An excess traction equal to that available when the vehicle is in the flat road traveling mode can be obtained while the vehicle is in the uphill traveling mode in the full-open throttle state by controlling the CVT 4 so that the traction is increased by a value corresponding to the incremental running resistance ΔR.

If the vehicle is in the uphill traveling mode, an engine torque T in the full-open throttle state at the present traveling speed V is set in steps S6 and S7.

In step S6, reference is made to a full-open throttle speed change characteristic curve indicated by a continuous line in a basic speed change characteristic map shown in a block for step S6 and a desired primary pulley speed $NP_s$ (desired engine speed) corresponding to the traveling speed V for the full-open throttle state is set. The basic speed change characteristic map is produced by determining desired primary pulley speeds $NP_s$ suitable for flat road traveling for traveling speed V and throttle opening $TH_o$ as parameters through simulation or experiments, and is stored in a ROM included in the CVT controller 21.

In step S7, the desired primary pulley speed $NP_s$ is used as a parameter indicating an engine speed $N_e$, reference is made to a full-open throttle characteristic curve in an engine torque map shown in a block for step S7, and an engine torque T in the full-open throttle state is set, and then the routine goes to step S11. The engine torque map is produced by determining engine torques T for engine speed $N_e$ and throttle opening $TH_o$ as parameters through simulation or experiments, and is stored in the ROM included in the CVT controller 21.

If the vehicle is in downhill traveling and ΔR≦0, the routine goes from step S5 to step S8.

A braking force equivalent to that available while the vehicle is in the flat road traveling mode is produced by engine brake when the vehicle is in the downhill traveling mode by controlling the CVT 4 so that engine brake is able to produce an excess braking force corresponding to the incremental running resistance ΔR for the full-closed throttle state.

Therefore, an engine torque T in the full-closed throttle state at the present traveling speed V is set in step S8 and S9 when the vehicle is in the downhill traveling mode.

In step S8, reference is made to a full-closed throttle state speed change characteristic curve indicated by a continuous line in the basic speed change characteristic map shown in a block for step S8 and a desired primary pulley speed $NP_s$ for the full-closed throttle state corresponding to the traveling speed V is set. Subsequently, in step S9, the desired primary pulley speed $NP_s$ is used as a parameter indicating an engine speed $N_e$, reference is made to a full-closed throttle characteristic curve in the engine torque map shown in a block for step S9, and an engine torque T for the full-closed throttle state is set, and then the routine goes to step S11.

The basic speed change characteristic map and the engine torque map to which reference is made in steps S8 and S9 are those used in steps S6 and S7, respectively.

When the vehicle is in the flat road traveling mode and X>ΔR>Y, the routine goes to step S10 to clear the speed change ratio correction Δr for shifting the basic speed change characteristic for flat road traveling toward the downshift side (Δr←0), the routine jumps to step S35 (FIG. 8) and the routine is ended after step S36.

When the vehicle is in the flat road traveling mode, the speed change ratio correction Δr is set to 0(Δr=0) to inhibit the correction of the basic speed change characteristic toward the downshift side so that unnecessary downshift is prevented while the vehicle is in the flat road traveling mode and the vehicle is able to travel stably.

When the vehicle is in uphill traveling (downhill traveling), the routine goes from step S7 (step S9) to step S11, in which a desired speed change ratio $r_s$ for the full-open throttle state (the full-closed throttle state) by using the desired primary pulley speed $NP_s$ and the actual secondary pulley speed $NS_o$ by using:

$$R_s = NP_s/NS_o \quad (2.1)$$

Subsequently, a traction $F_s$ for the full-open throttle state (the full-closed throttle state) in the flat road traveling mode is calculated in step S12 by using the engine torque T for the full-open throttle state (the full-closed throttle state), the desired speed change ratio $r_s$, the overall gear ratio $G_r$, the effective diameter 1 of the driving wheel 7a and the following expression.

$$F_s = T \times r_s \times G_r/1 \quad (2.2)$$

In step S13, reference is made to a correction coefficient table and interpolation is executed with respect to the traveling speed V to set a correction coefficient $K_{vsw}$ ($0 \leq K_{vsw} \leq 1$) for correcting the incremental running resistance ΔR according to the operating condition. The correction coefficient $K_{vsw}$ is a factor for weighting the incremental running resistance ΔR so that the incremental running resistance ΔR decreases as the traveling speed V increases to avoid the operation of the engine 1 at an excessively high engine speed. The correction coefficient $K_{vsw}$ is 0 for traveling speed ranges not requiring speed change ratio correction, such as a very low traveling speed range and a high traveling speed range, and increases gradually from 0 toward 1 as the traveling speed increases from that in a low traveling speed range toward that in a middle traveling speed, is equal to 1 for a middle traveling speed range, and decreases from 1 toward 0 as the traveling speed increases from that in the middle traveling speed range toward that in a high traveling speed range. Different correction coefficient tables respectively for the uphill traveling mode and the downhill traveling mode may be used.

In step S14, a corrected incremental running resistance obtained by correcting the incremental running resistance ΔR by weighting the same by the correction coefficient $K_{vsw}$ is added to the traction $F_s$ to calculate a desired traction $F_d$ of the actually achieved traction F(t).

$$F_d = F_s + \Delta R \times K_{vsw} \quad (2.3)$$

Since downshift in, for example, a high traveling speed range is limited to a low degree by correcting the incremental running resistance ΔR by using the correction coefficient $K_{vsw}$, excessive increase in engine speed can be suppressed, vibrations and noise are reduced and fuel consumption is reduced.

The correction coefficient $K_{vsw}=0$ when the traveling speed is in a traveling speed not requiring speed change ratio correction, such as the very low traveling speed range or the high traveling speed range. Therefore, $$F_d = F_s \quad (2.3')$$

The correction coefficient $K_{vsw}=1$ when the traveling speed is in the middle traveling speed range and therefore, $$F_d = F_s + \Delta R \quad (2.3'')$$

Figure 9:
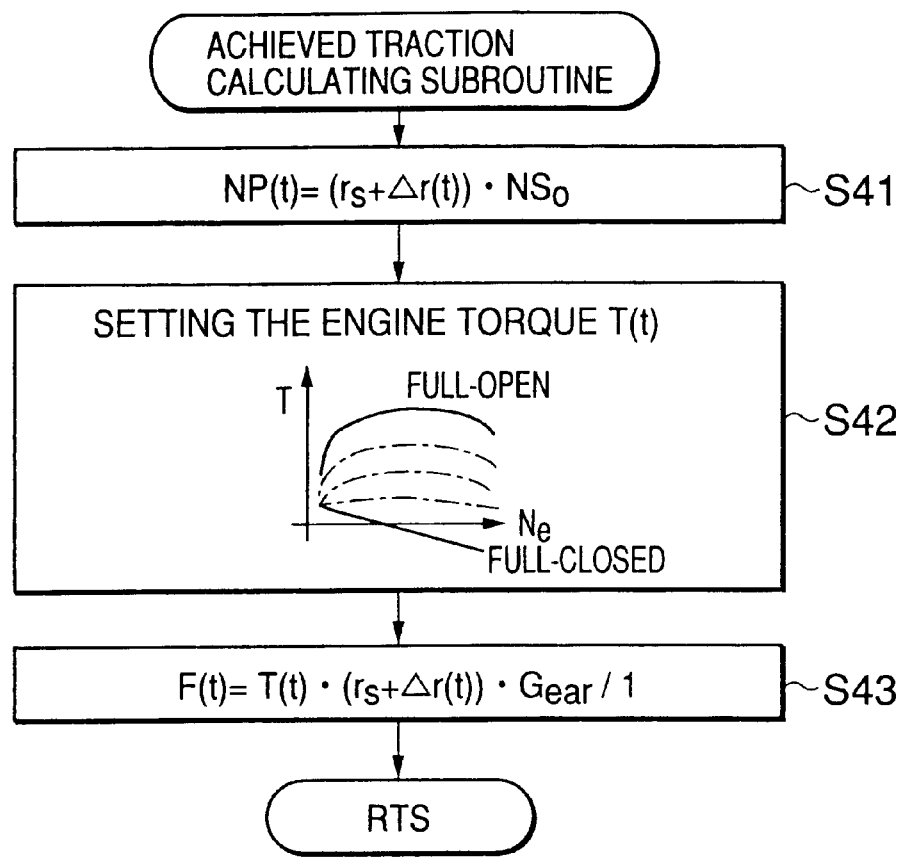
FIG. 9 is flow chart of an achieved traction calculating subroutine to be executed by the CVT controller shown in FIG. 4.

In step S15, the speed change ratio correction Δr set in the preceding cycle of the routine is changed for a speed change correction Δr(t) (Δr(t)←Δr), an achieved traction calculating subroutine shown in FIG. 9 is executed in step S16 to calculate an achieved traction F(t). The achieved traction F(t) is an estimated traction obtained by speed change ratio correction for the full-open throttle or the full-closed throttle state, i.e., by shifting the speed change ratio toward the downshift side. In the achieved traction calculating subroutine, primary pulley speed NP(t) in the full-open throttle or the full-closed throttle state is calculated in step S41 by using:

$$NP(t) = \{r_s + \Delta r(t)\} \times NS_o \quad (3.1)$$

where $\{r_s + \Delta r(t)\}$ is a desired speed change ratio for the full-open throttle or the full-closed throttle state obtained by shifting the speed change ratio toward the downshift side for speed change ratio correction.

In step S42, reference is made to the upper most curve indicated by a continuous line in the engine torque map when the throttle valve is fully opened or to the lower most curve indicated by a continuous line in the engine torque map when the throttle valve is fully closed by using the primary pulley speed NP(t) as a parameter indicating engine speed N, to set an engine torque T(t) for the full-open throttle or the full-closed throttle state.

In step S43, the engine torque T(t) is subjected to speed change ratio correction by using Expression (3.2) to calculate the achieved traction F(t), and then the routine returns to step S17 (FIG. 7) for a speed change characteristic correction routine.

$$F(t)=T(t)\times\{r_s+\Delta r(t)\}\times G_r/1 \tag{3.2}$$

In step S17 of the speed change characteristic correcting routine, the absolute value of the difference between the desired traction $F_d$ and the achieved traction $F(t)$ is compared with a set value h to see whether the achieved traction $F(t)$ is within a range (dead zone) dependent on the set value h around the desired traction $F_d$.

If $|F_d-F(t)|\leq h$, i.e., if the achieved traction $F(t)$ is within a traction hysteresis dependent on the set value h, the update of the speed change ratio correction $\Delta r$ is ended and the routine jumps to step S35.

The set value h defines a hysteresis (dead zone) for deciding whether the achieved traction $F(t)$ has coincided with the desired traction $F_d$ to avoid the unnecessary variation of the speed change ratio correction $\Delta r$ according to the variation of the desired traction $F_d$.

If $|F_d-F(t)|>h$, the routine goes to step S18 or S34 to update the speed change ratio correction $\Delta r$ by a set value at a time until the achieved traction $F(t)$ fall in the dead zone around the desired traction $F_d$.

In steps S18 and S19, the incremental running resistance $\Delta R$ is compared with the uphill criterion X ($\geq 0$) and the downhill criterion Y($\leq 0$) to decide that the vehicle is in the uphill traveling mode, in the downhill traveling mode or in the flat road traveling mode. The speed change ratio correction $\Delta r$ is updated for the uphill traveling mode or the downhill traveling mode. If $X>\Delta R>Y$, i.e., if the vehicle is in the flat road traveling mode the speed change ratio correction $\Delta r$ is not updated and the speed change ratio correction $\Delta r$ determined in the preceding cycle is held and the routine jumps to step S35.

A speed change ratio correction updating procedure for the uphill traveling mode will be described.

When the vehicle is in the uphill traveling mode and $\Delta R \geq X$, i.e., the response in step S18 is affirmative, the desired traction $F_d$ and the achieved traction $F(t)$ are compared in step S20. If $F_d>F(t)$, an excess traction in the full-open throttle state is insufficient. Therefore, a set speed change ratio increment $\alpha$ is added to the speed change ratio correction $\Delta r$ set in the preceding cycle in step S21 to determine an increased speed change ratio correction $\Delta r(t)$.

$$\Delta r(t)=\Delta r+\alpha \tag{3.3}$$

Figure 10:
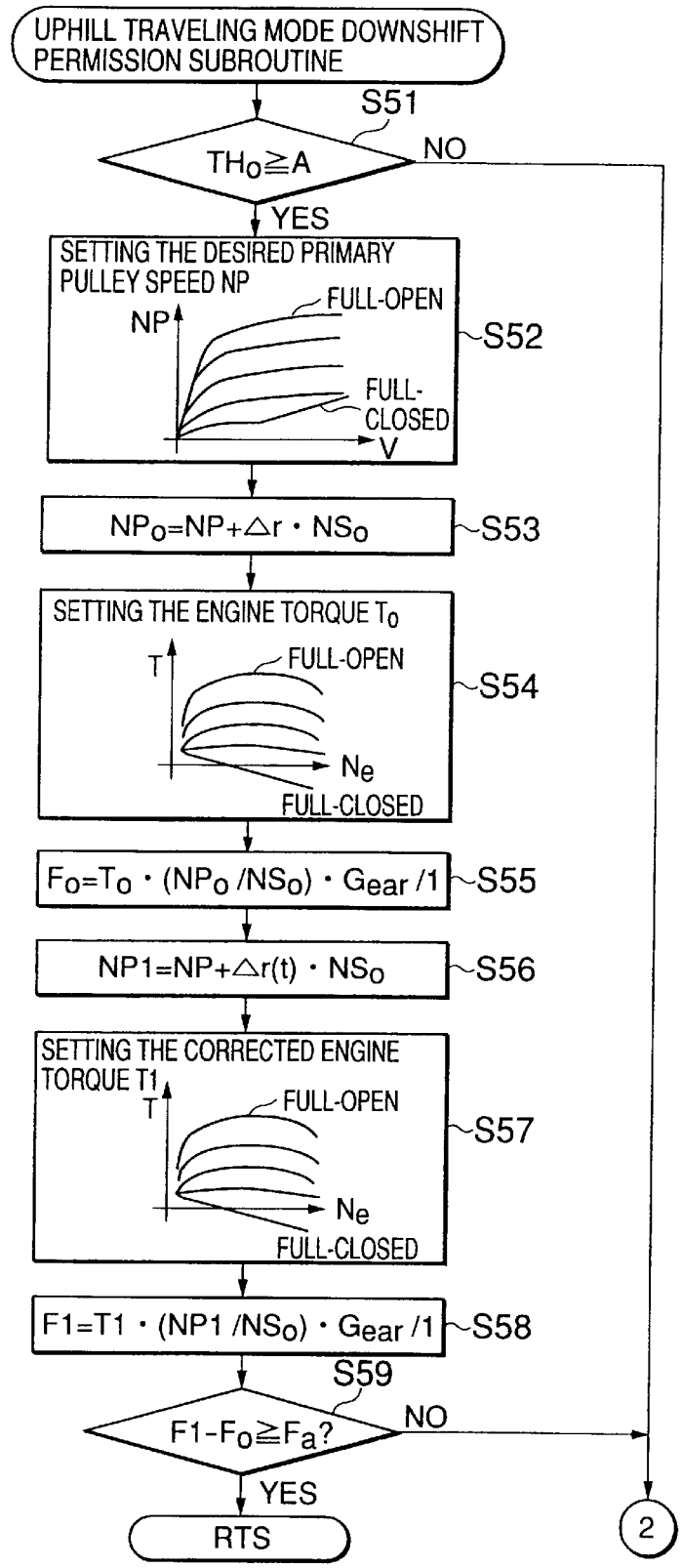
FIG. 10 is flow chart of an uphill traveling mode downshift permission subroutine to be executed by the CVT controller shown in FIG. 4.

Then, in step S22, an uphill traveling mode downshift permission subroutine shown in FIG. 10 is carried out to see whether downshift correction in the uphill traveling mode is permitted. In step S51, the throttle opening $TH_o$, a parameter indicating engine load, is compared with a set value A to see if the driver has any intention of accelerating the vehicle. An intake vacuum below the throttle valve, a basic injection quantity (basic fuel injection pulse width), an injection quantity (fuel injection pulse width), an estimated traction, an estimated power or an engine torque may be used as a parameter indicating engine load instead of throttle opening $TH_o$ for deciding whether or not the driver has an intention of accelerating the vehicle.

If $TH_o<A$, it is decided that the driver has no intention of accelerating the vehicle, the speed change correction $\Delta r$ set in the preceding cycle is held, the uphill traveling mode downshift permission subroutine is ended, and the routine goes to step S35 of the speed change characteristic correcting routine.

If $TH_o \geq A$, it is decided in step S51 that the driver has an intention of accelerating the vehicle (request for acceleration), reference is made to the basic speed change characteristic map with respect to the throttle opening $TH_o$ and the present traveling speed V and interpolation is executed to set a desired primary pulley speed NP for the flat road traveling mode in step S52.

In step S53, a desired primary pulley speed $NP_o$ for the uphill traveling mode is calculated, in which the product of the actual secondary pulley speed $NS_o$ and the speed change ratio correction $\Delta r$ indicating a differential speed change ratio is added to the desired primary speed NP.

$$NP_o=NP+\Delta r\times NS_o \tag{3.4}$$

In step S54, reference is made to the engine torque map with respect to the desired primary pulley speed $NP_o$ as a parameter indicating engine speed $N_e$, and the present throttle opening $TH_o$ as a parameter indicating engine load, and interpolation is executed to set an engine torque $T_o$ for the desired primary pulley speed $NP_o$.

In step S55, the present traction $F_o$ is calculated by using:

$$F_o=T_o\times(NP_o/NS_o)\times G_r/1 \tag{3.5}$$

where $NP_o/NS_o$ is a present desired speed change ratio.

In step S56, a primary pulley speed NP1 after the shift of the primary pulley speed toward the downshift side is calculated by using:

$$NP1=NP+\Delta r(t)\times NS_o \tag{3.6}$$

In step S57, reference is made to the engine torque map with respect to the primary pulley speed NP1 as a parameter indicating engine speed $N_e$ and the present throttle opening $TH_o$ and interpolation is executed to set a corrected engine torque T1 determined by shifting the basic engine torque toward the downshift side.

In step S58, a corrected traction F1 is determined by shifting the basic traction toward the downshift side by using:

$$F1=T1\times(NP1/NS_o)\times G_r/1 \tag{3.7}$$

where $NP1/NS_o$ is a corrected desired speed change ratio determined by shifting the desired speed change ratio toward the downshift side.

In step S59, the tractions $F_o$ and F1 are compared to see if $F1-F_o \geq F_a$ (a set value greater than 0). If $F1-F_o<F_a$ and an increase in traction greater than the predetermined value $F_a$ cannot be expected by downshift of a downshift amount corresponding to the set speed change ratio increment $\alpha$, or the traction F1 has a tendency to decrease, the speed change ratio correction $\Delta r$ is not updated in the present cycle, the speed change ratio correction $\Delta r$ determined in the preceding cycle is held, and the routine goes to step S35 of the speed change characteristic correcting routine. If $F1-F_o \geq F_a$, an increase in traction greater than the predetermined value $F_a$ by downshift of a downshift amount corresponding to the set speed change ratio increment $\alpha$ can be expected. Therefore, the update of the speed change ratio correction $\Delta r$ in the present cycle is permitted and the routine goes to step S23 of the speed change characteristic correcting routine.

Thus, the uphill traveling mode downshift permission subroutine compares the throttle opening $TH_o$ with the set value A to find whether or not the driver has an intention of accelerating the vehicle, and inhibits downshift correction if the increase of the traction $F_o$ to the corrected traction F1 greater than the traction $F_o$ by a value greater than the set value $F_a$. Therefore, an unpleasant sensation felt by the driver due to an insufficient torque determined by shifting the torque toward the downshift side can be reduced. Engine torque or power may be used instead of the tractions $F_o$ and F1.

Figure 7:
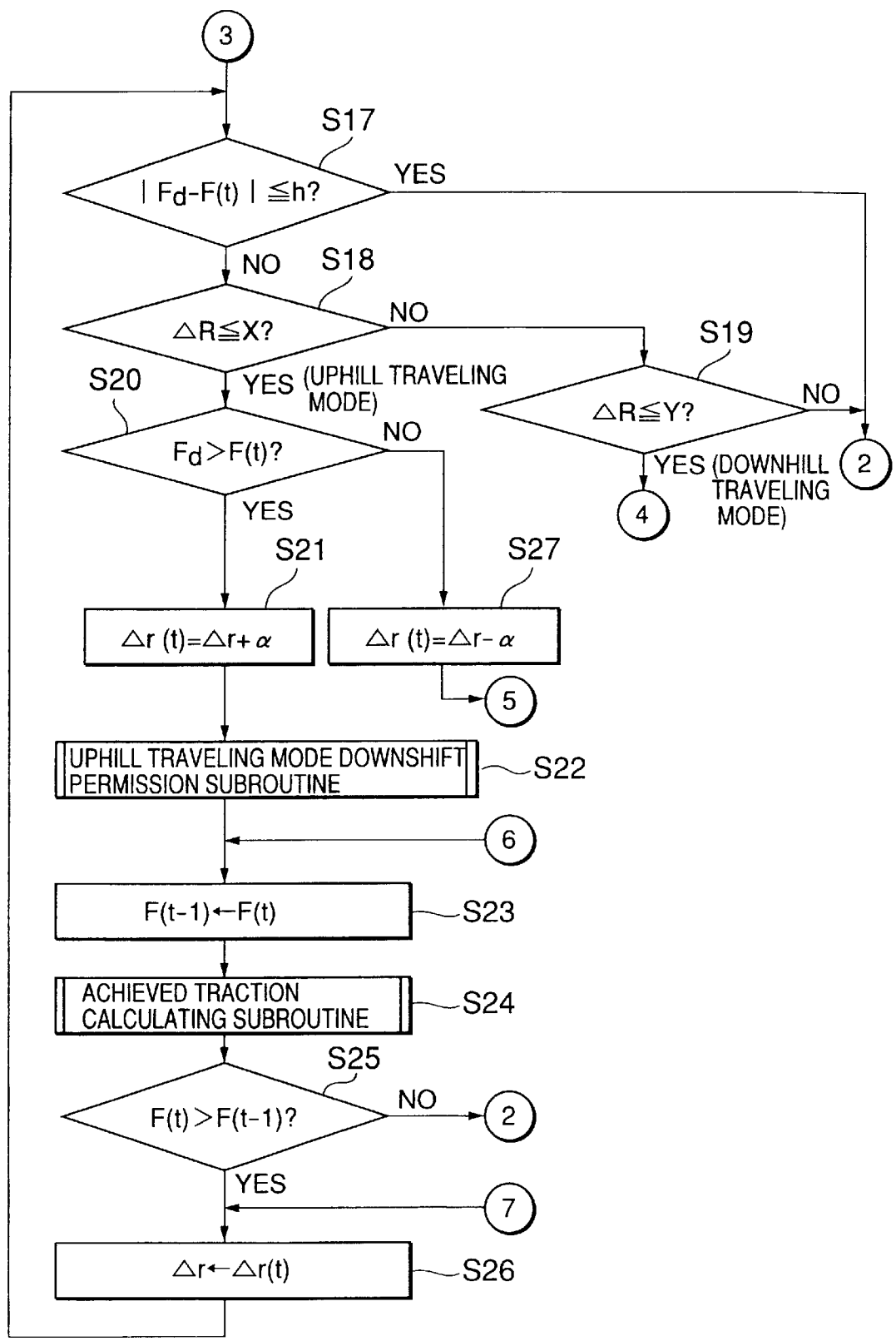
FIG. 7 is flow chart of a part of the speed change characteristic correcting routine.

The routine goes to step S23 of the speed change characteristic correcting routine shown in FIG. 7 after completing the uphill traveling mode downshift permission subroutine. In step S23, the achieved traction F(t−1) determined in the preceding cycle is changed for the achieved traction F(t) (F(t−1)←F(t)), and the achieved traction calculating subroutine shown in FIG. 9 is executed in step S24 to calculate the present achieved traction F(t) on the basis of the speed change ratio correction Δr(t) determined in the present cycle.

Then, in step S25, the present achieved traction F(t) and the preceding achieved traction F(t−1) set in step S23 are compared. If F(t)≦F(t−1) and the increase of the traction by shifting the speed change ratio toward the downshift side by a downshift amount corresponding to the set incremental speed change ratio α cannot be expected, operation for updating the speed change ratio correction Δr is ended and the routine goes to step S35.

If F(t)>F(t−1), the increase of the traction by shifting the speed change ratio toward the downshift side by a downshift amount corresponding to the set speed change ratio increment α can be expected. Therefore, step S26 is executed to change the speed change ratio correction Δr for a speed change ratio correction Δr(t) determined in the present cycle (Δr←Δr(t)), and then the routine returns to step S17. The foregoing steps are repeated until the achieved traction F(t) falls within a traction hysteresis defined by the set value h around the desired trancion $F_d$.

If it is decided in step S20 that $F_d$≦F(t), i.e., if an excess traction in the full-open throttle state is excessive, step S27 is executed to reduce the speed change ratio correction Δr by the set speed change ratio increment α to determine a new speed change ratio correction Δr(t), and then the routine goes to step S28.

$$\Delta r(t) = \Delta r - \alpha \qquad (3.8)$$

In step S28, the achieved traction F(t−1) determined in the preceding cycle is changed for the achieved traction F(t) determined in the present cycle (F(t−1)←F(t)), the achieved traction calculating subroutine shown in FIG. 9 is executed in step S29 to calculate the present achieved traction F(t) on the basis of the speed change ratio correction Δr(t) determined in the present cycle. Then, in step 30, the present achieved traction F(t) calculated in step S29 and the preceding achieved traction F(t−1) updated in step 28 are compared. If F(t)≧F(t−1) and the further reduction of the traction by shifting the speed change ratio toward the upshift side by an upshift amount corresponding to the set incremental speed change ratio α cannot be expected, operation for updating the speed change ratio correction Δr is ended and the routine goes to step S35.

If F(t)<F(t−1), the reduction of the traction by shifting the speed change ratio toward the upshift side by an upshift amount corresponding to the set speed change ratio increment α can be expected. Therefore, the routine returns to step S26 to change the speed change ratio correction Δr for the speed change ratio correction Δr(t) determined in the present cycle (Δr←Δr(t)), and then the routine returns to step S17. The foregoing steps are repeated until the achieved traction F(t) falls in the set traction hysteresis h around the desired traction $F_d$.

A speed change ratio correction updating procedure for the downhill traveling mode will be described hereinafter. If ΔR≦Y and the response to a query made in step S19 is affirmative, the routine goes to step S31 to compare the desired traction $F_d$ and the achieved traction F(t). If $F_d$>F(t), an engine brake force available in a full-closed throttle state at the present traveling speed V is excessively high. Therefore, a set speed change ratio decrement β is added to the speed change ratio correction Δr determined in the preceding cycle to set a speed change ratio correction Δr(t) to limit downshift amount.

$$\Delta r(t) = \Delta r - \beta \qquad (4.1)$$

Then, in step S23, the preceding achieved traction F(t−1) is changed for the present achieved traction F(t), the achieved traction calculating subroutine shown in FIG. 9 is carried out in step S24 to calculate the achieved traction F(t) on the basis of the present speed change ratio correction Δr(t), and then the present achieved traction F(t) and the preceding achieved traction F(t−1) are compared in step S25. If F(t)≦F(t−1) and the further reduction of the engine brake force (the increase of the traction) by the shift of the set speed change ratio β toward the upshift side cannot be expected, the operation for the update of the speed change ratio correction Δr is ended and the routine jumps to step S35. If F(t)>F(t−1), a reduction in engine brake force (an increase in the traction) by the shift of the speed change ratio toward the upshift side can be expected. Therefore, the speed change ratio correction Δr is changed for the present speed change ratio correction Δr(t)(Δr←Δr(t)) in step S26, and then the routine returns to step S17.

If $F_d$≦F(t) and it is decided in step S31 that the engine brake force in the full-closed throttle state at the present traveling speed V is insufficient, step S33 is executed to set a present speed change ratio correction Δr(t) by adding the set speed change ratio decrement β to the preceding speed change ratio correction Δr in order that the downshift amount is increased.

$$\Delta r(t) = \Delta r + \beta \qquad (4.2)$$

Figure 11:
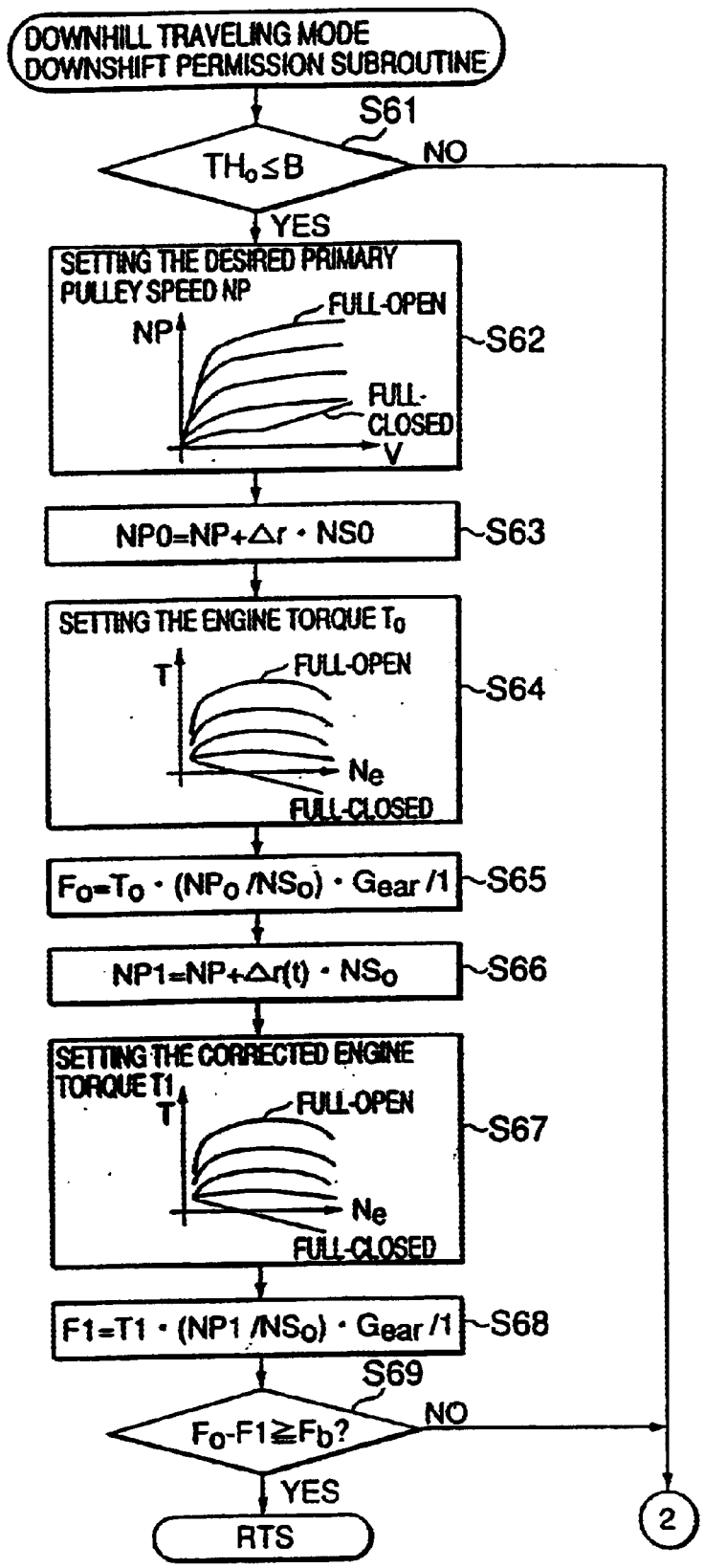
FIG. 11 is flow chart of a downhill traveling mode downshift permission subroutine to be executed by the CVT controller shown in FIG. 4.

In step S34, a downhill traveling mode downshift permission subroutine shown in FIG. 11 is carried out to decide whether downhill traveling mode downshift correction is permitted.

First, in step S61, the throttle opening $TH_o$ used as a parameter indicating engine load is compared with a set value B to see whether the driver has an intention of using engine brake. An intake vacuum below the throttle valve, a basic injection quantity (basic fuel injection pulse width), an injection quantity (fuel injection pulse width), an estimated traction, an estimated power or an engine torque may be used as a parameter indicating engine load instead of throttle opening $TH_o$ for deciding whether or not the driver has an intention of using engine brake.

If $TH_o$>B and it is decided that the driver has no intention of using engine brake, the preceding speed change ratio correction Δr is held, the subroutine is ended and the routine goes to step S35 of the speed change characteristic correcting routine.

If $TH_o$≦B and it is decided that the driver has an intention of using engine brake, i.e., if there is a request for engine brake, the routine goes to the step S62, reference is made to the basic speed change characteristic map with respect to the present throttle opening $TH_o$ and the present traveling speed V and interpolation is executed to set a desired primary pulley speed NP for the flat road traveling mode.

In step S63, a desired primary pulley speed $NP_o$ for the downhill traveling mode is calculated by using:

$$NP_o = NP + \Delta r \times NS_o \qquad (4.3)$$

In step S64, reference is made to the engine torque map with respect to the desired primary pulley speed $NP_o$ as a parameter indicating engine speed $N_e$ and the present throttle opening $TH_o$ as a parameter indicating engine load, and interpolation is executed to set an engine torque $T_o$ for driving the primary pulley for rotation at the desired primary pulley speed $NP_o$.

In step S65, a present traction $F_o$ is calculated by using:

$$F_o = T_o \times (NP_o/NS_o) \times G_R/1 \tag{4.4}$$

where $NP_o/NS_o$ is the present desired speed change ratio.

In step S66, a corrected primary pulley speed NP1, i.e., a desired primary pulley speed determined by shifting the desired primary pulley speed NP for the flat road traveling mode toward the downshift side, is calculated by using:

$$NP1 = NP + \Delta r(t) \times NS_o \tag{4.5}$$

In step S67, reference is made to the engine torque map with respect to the primary pulley speed NP1 as a parameter indicating engine speed $N_e$ and the present throttle opening $TH_o$ as a parameter indicating engine load and interpolation is executed to set a corrected engine torque T1 determined by shifting the basic engine torque toward the downshift side.

Then, in step S68, a corrected traction F1, i.e., a traction determined by shifting a basic traction toward the downshift side, is calculated by using:

$$F1 = T1 \times (NP1/NS_o) \times G_r/1 \tag{4.6}$$

where $NP1/NS_o$ is a desired speed change ratio determined by correction toward the downshift side.

In step S69, the tractions $F_o$ and F1 are compared. If $F_o - F1 < F_b$ (a predetermined value greater than 0) and an increase of engine brake force not lower than the predetermined value $F_b$ cannot be expected, the present speed change ratio correction $\Delta r$ is not updated, the preceding speed change ratio correction $\Delta r$ is held and the routine goes to step S35 of the speed change characteristic correcting routine, If $F_o - F1 \geq F_b$, an increase of engine brake force not lower than the predetermined value $F_b$ by the shift of the speed change ratio toward the downshift side can be expected, the update of the speed change ratio correction $\Delta r$ is permitted and the routine goes to step S28 of the speed change characteristic correcting routine.

Thus, the downhill traveling mode downshift permission subroutine compares the throttle opening $TH_o$ and the set value B to decide whether or not the driver has an intention of using engine brake, and inhibits downshift if $F_o - F1 < F_b$ and any effective increase of engine brake force cannot be expected. Therefore an unpleasant sensation felt by the driver due to an insufficient engine brake force determined by downshift correction can be reduced. Engine torque or power may be used instead of the tractions $F_o$ and F1.

Figure 8:
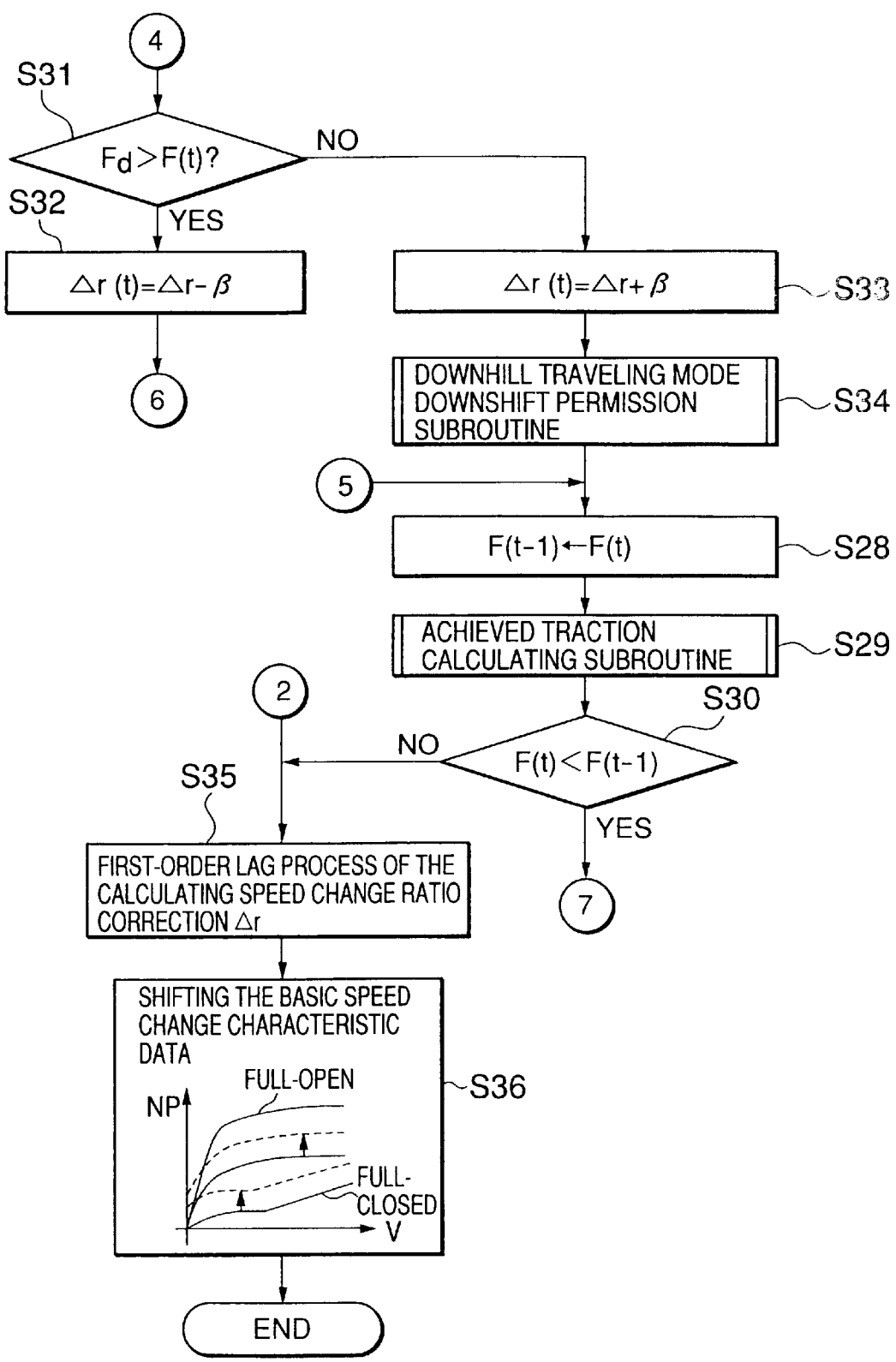
FIG. 8 is flow chart of a part of the speed change characteristic correcting routine.

After the completion of the downhill traveling mode downshift permission subroutine, the routine goes to step S28 of the speed change characteristic correcting routine shown in FIG. 8. The preceding achieved traction F(t−1) is changed for the present achieved traction F(t) (F(t−1)←F(t)). Then, the achieved traction calculating subroutine shown in FIG. 9 is carried out in step S29 to calculate a present achieved traction F(t) based on the present speed change ratio correction $\Delta r(t)$.

In step S30, the present achieved traction F(t) calculated in step S29 and the preceding achieved traction F(t−1) updated in step S28 are compared. If $F(t) \geq F(t-1)$ and the further increase of the engine brake force by the shift of the speed change ratio by the set speed change ratio β toward the downshift side cannot be expected, the operation for the update of the speed change ratio correction $\Delta r$ is ended and the routine jumps to step S35.

If F(t)<F(t−1), an increase in engine brake force by the shift of the speed change ratio toward the downshift side by the set speed change ratio β can be expected. Therefore, the speed change ratio correction $\Delta r$ is changed for the present speed change ratio correction $\Delta r(t)$ ($\Delta r \leftarrow \Delta r(t)$) in step S26, and then the routine returns to step S17. The foregoing steps are repeated until the achieved traction F(t) falls in the set traction hysteresis h around the desired drivcing force $F_d$.

In step S35, the calculated speed change ratio correction $\Delta r$ is subjected to a first-order lag process to delay the sudden change of the speed change ratio correction $\Delta r$ in order that the speed change ratio varies smoothly and the traveling performance of the vehicle is improved. Then, in step S36, all the basic speed change characteristic data on the desired primary pulley speed NP stored in the basic speed change characteristic map excluding the data on the desired primary pulley speed for the full-open throttle state is shifted by a value corresponding to the speed change ratio correction $\Delta r$ toward the downshift side, and then the routine is ended.

Reference is made to the basic speed change characteristic map of data shifted toward the downshift side by the foregoing procedure to set a desired primary pulley speed NP and the speed change ratio is controlled by a known method to downshift the CVT 4 by an optimum downshift amount in the uphill traveling mode and the downhill traveling mode in order that excessive rise in engine speed due to downshift is avoided, vibrations and noise are suppressed, and the controllability of the vehicle can be improved.

When controlling the speed change ratio, reference is made to the shifted speed change characteristic map produced by shifting the basic speed change characteristic map by the speed change correction $\Delta r$ toward the downshift side with respect to the traveling speed V and the throttle opening $TH_o$ and interpolation is executed to set a desired primary pulley speed NP. As mentioned above, a desired speed change ratio $i_s$ is calculated by using the desired primary pulley speed NP and the actual secondary pulley speed $NS_o$ ($i_s = NP/NS_o$), the difference between the desired speed change ratio $i_s$ and the actual speed change ratio i ($=NP_i/NS_o$, where $NP_i$ is an actual primary pulley speed) is multiplied by a coefficient K to calculate a speed change rate di/dt for adjusting the actual speed change ratio i to the desired speed change ratio $i_s$ (di/dt=K($i_s$−i)). A solenoid drive current corresponding to the speed change rate di/dt is set, the solenoid drive current is supplied to the proportional solenoid actuator 31a of the speed change control valve 31 to control the primary pressure $P_p$. Consequently, the groove width of the primary pulley 4a is controlled such that the actual primary pulley speed $NP_i$ corresponding to the actual engine speed $N_e$ is adjusted to the desired primary pulley speed NP.

The foregoing loop of steps is repeated to update the speed change ratio correction $\Delta r$ repeatedly until the achieved traction F(t) falls in the set range h around the desired traction $F_d$. If a change speed ratio correction updating cycle for updating the speed change ratio correction $\Delta r$ can be repeated at a very short period relative to the period of a desired traction updating cycle for updating the desired traction $F_d$, for example, a period of 10 ms as against a period of 100 ms for the desired traction updating cycle, the routine may jump to step S35 of FIG. 8 from step S26 of FIG. 7 immediately after the update of the speed change ratio correction $\Delta r$, and the achieved traction F(t) can be adjusted to the desired traction $F_d$ by such a manner.

This embodiment updates the speed change ratio correction Δr (step S26) by adding set value to or subtracting the same from the speed change ratio correction Δr (steps S21, S27, S32, S33), subjects the speed change ratio correction Δr to a first-order lag process, and shifts the basic speed change characteristic map toward the downshift side. Instead, the basic speed change characteristic map may be shifted toward the downshift side by correcting the data on the desired primary pulley speed NP known from the basic speed change characteristic map by using a desired primary pulley speed correction (desired engine speed correction) $\Delta NP_s$. If the desired primary pulley speed correction (desired engine speed correction) $\Delta NP_s$ is employed, steps S21 and S27 may be used for subjecting the desired primary pulley speed $NP_s$ in the full-open throttle state to addition and subtraction, respectively, and steps S32 and S33 may be used for subjecting the desired primary pulley speed $NP_s$ in the full-closed throttle state to addition and subtraction, respectively, to adjust the achieved traction F(t) to the desired traction $F_d$ and to set the desired primary pulley speed correction $\Delta NP_s$. The data on the desired primary pulley speed NP known from the basic speed change characteristic map is corrected by the desired primary pulley speed correction $\Delta NP_s$ ($NP \leftarrow NP + \Delta NP_s$) and a desired speed change ratio $i_s$ is calculated by using the corrected desired primary pulley speed NP.

A CVT controller in a second embodiment according to the present invention will be described with reference to FIGS. 12 to 14. In the second embodiment, the incremental running resistance ΔR is corrected by weighting taking into consideration a factor relating to throttle opening $TH_o$ in addition to that relating to traveling speed V.

Figure 6:
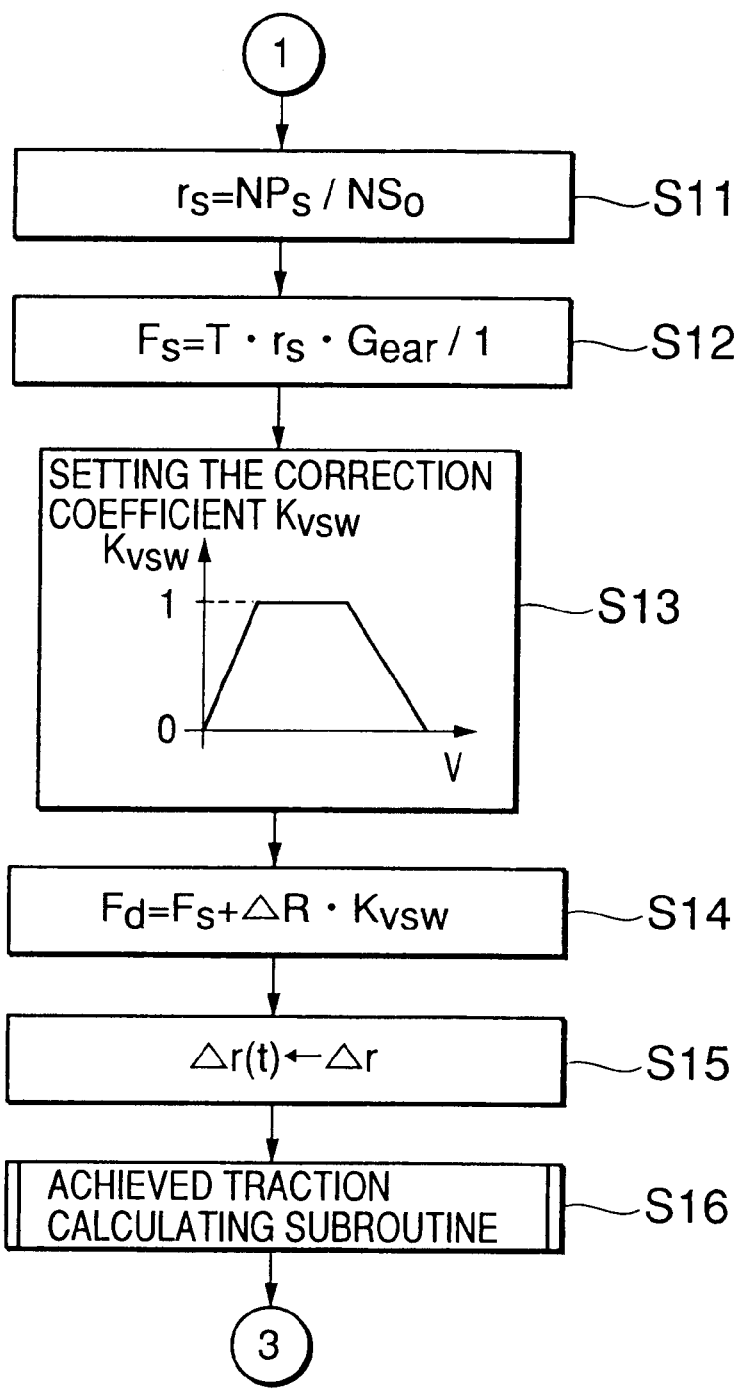
FIG. 6 is flow chart of a part of the speed change characteristic correcting routine.
Figure 12:
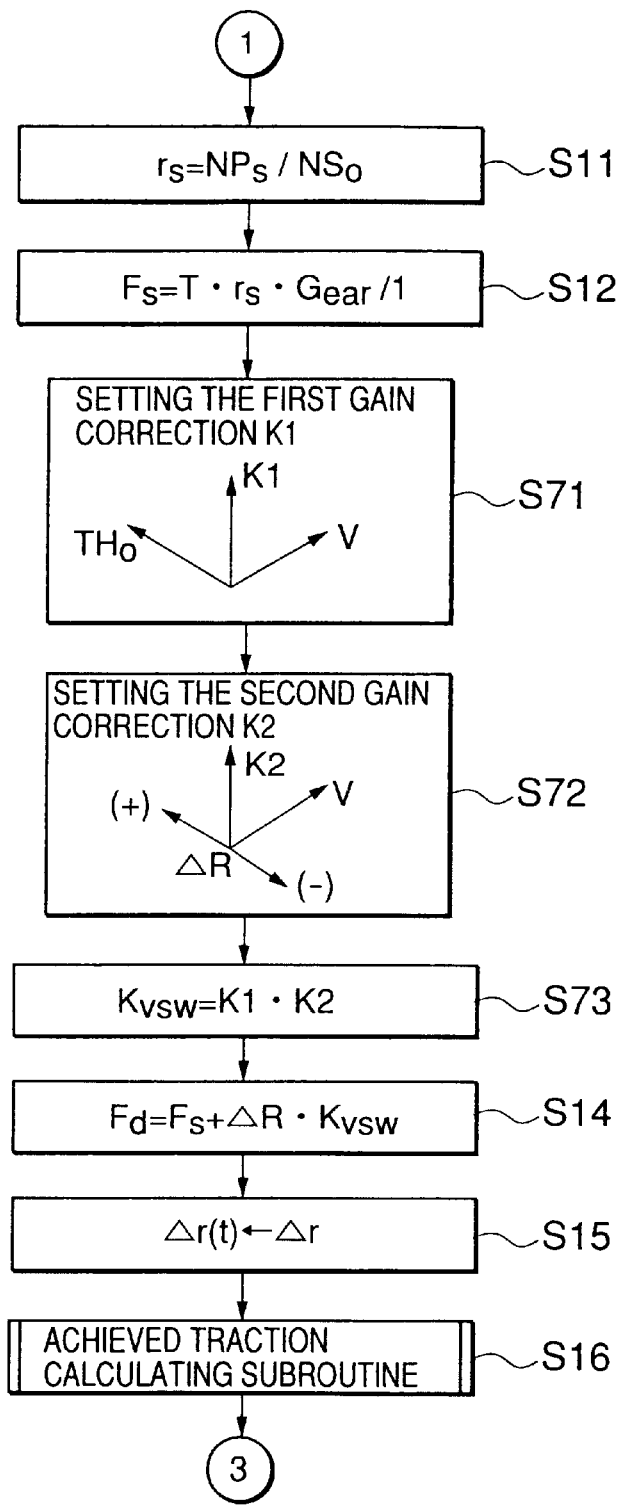
FIG. 12 is a flow chart of a speed change characteristic correcting routine to be executed by a CVT controller in a second embodiment according to the present invention.

The second embodiment carries out a routine shown in FIG. 12 instead of the routine shown in FIG. 6. In FIG. 12 steps similar to those shown in FIG. 6 are designated by the same step numbers and the description thereof will be omitted.

A correction coefficient $K_{vsw}$ is set after the traction $F_s$ for the full-closed throttle state has been calculated. Referring to FIG. 12, reference is made to a first gain correction map with respect to the traveling speed V and the throttle opening $TH_o$ and interpolation is executed to set a first gain correction K1 ($0 \leq K1 \leq 1$) in step S71, and reference is made to a second gain correction map with respect to the traveling speed V and the incremental running resistance and interpolation is executed to set a second gain correction K2 ($0 \leq K2 \leq 1$) in step S72.

In step S73, the first gain correction K1 is multiplied by the second gain correction K2 to calculate the correction coefficient $K_{vsw}$ for weighting the incremental running resistance ΔR.

$$K_{vsw} = K1 \times K2 \tag{5.1}$$

A desired traction $F_d$ is calculated in step S14 by using:

$$F_d = F_s + \Delta R \times K_{vsw} \tag{5.2}$$

where $F_s$ is traction for the full-open throttle or the full-closed throttle state.

Figure 13A:
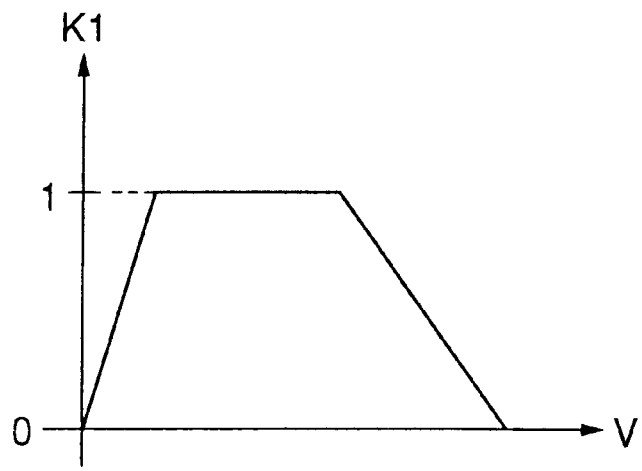
FIG. 13 is a diagram showing a K1 map to be used by the CVT controller in the second embodiment.
Figure 13B:
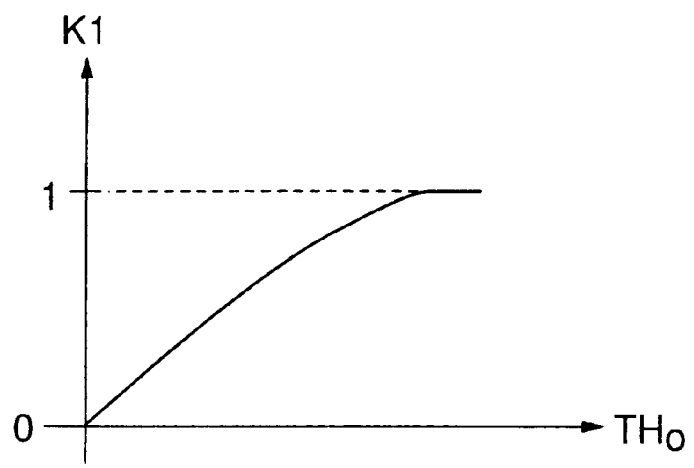
Figure 14A:
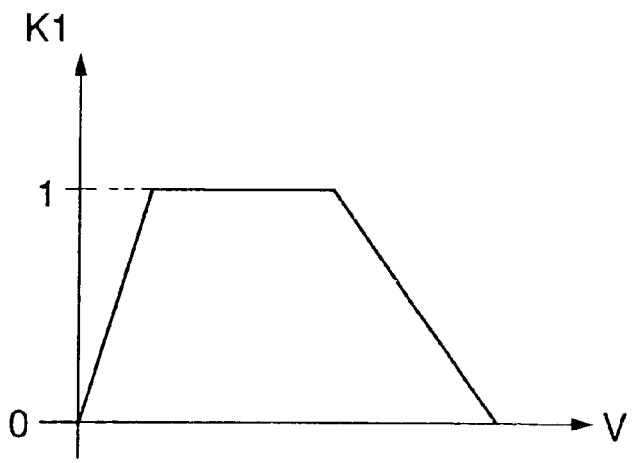
FIG. 14 is a diagram showing a K2 map to be used by the CVT controller in the second embodiment.
Figure 14B:
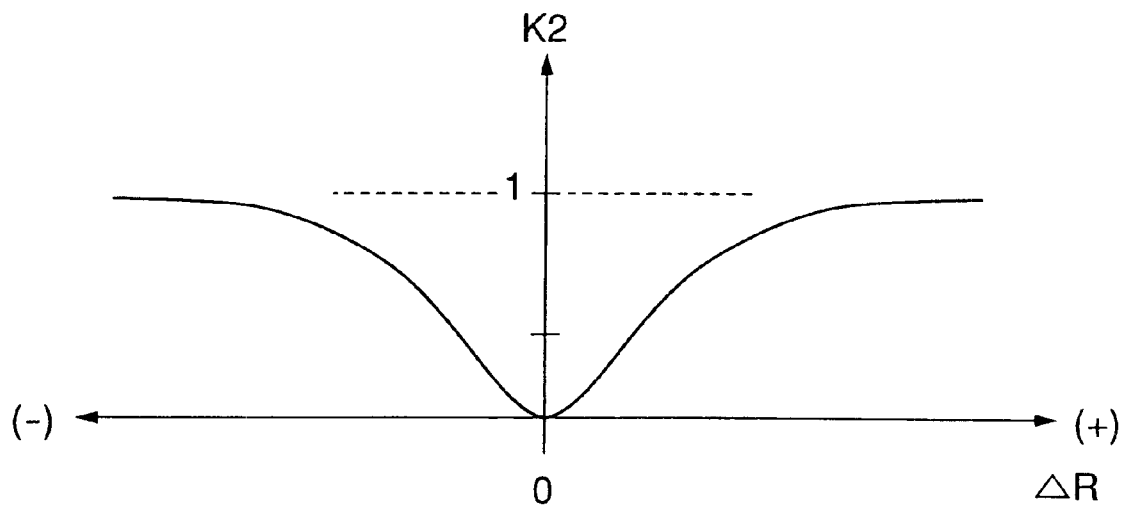

In the first gain correction map to which reference is made in step S71, the first gain correction K1 increases as the throttle opening $TH_o$ increases as shown in FIG. 13(b). In the second gain correction map to which reference is made in step S72, the second gain correction K2 increases as the absolute value of the incremental running resistance ΔR increases as shown in FIG. 14(b). The respective modes of dependence of the first gain correction K1 and the second gain correction K2 on the traveling speed V are the same as shown in FIGS. 13(a) and 14(a) as those in the first embodiment.

Since the correcting coefficient $K_{vsw}$ employed in the second embodiment in weighting the incremental running resistance ΔR for correction is the product of the first gain correction K1 dependent on the traveling speed V and the throttle opening $TH_o$ and the second gain correction $K_w$ dependent on the traveling speed V and the incremental running resistance ΔR, the incremental running resistance ΔR can more smoothly be weighted for correction when the engine is operating under a higher engine load and at a higher engine speed.

Only either the first gain correction K1 or the second gain correction K2 may be used to determine the weighting coefficient $K_{vsw}$.

Thus, the foregoing embodiments calculate the incremental running resistance ΔR on the basis of a running resistance that will act on the vehicle when the vehicle is in the flat road traveling mode, and shift the speed change characteristic automatically by a value corresponding to the incremental running resistance ΔR toward the downshift side. Therefore, control input to the throttle valve (accelerator pedal) necessary to deal with increase in running resistance when the vehicle starts uphill traveling can be reduced and hence the operation of the vehicle is improved greatly. Operation necessary for using engine brake for downhill traveling can be simplified. Accordingly, the frequency of setting the engine for an accelerating mode during uphill traveling is reduced. A fuel cut region during downhill traveling can be expanded by maintaining the lowest speed change line on a high level to improve fuel consumption.

Since the lowest speed change line is held on a high level, the frequency of speed change ratio variation due to frequent operations for alternate stepping on and releasing the accelerator pedal (busy shift) can be reduced and the unpleasant sensation due to upshift resulting from the release of the accelerator pedal can be reduced.

The present invention is not limited in its practical application to the foregoing embodiments. For example, the desired traction Fd may be calculated in step S14 (FIGS. 6 and 12) by using:

$$F_d = F_s + \Delta R \tag{6.1}$$

and the updated speed change correction Δr(t) may be calculated by using:

$$\Delta r(t) = \Delta r \times K_{vsw} \tag{6.2}$$

instead of by multiplying the incremental running resistance ΔR by the correction coefficient $K_{vsw}$.

If the desired primary pulley speed correction $\Delta NP_s$ is employed instead of the speed change ratio correction Δr, the desired primary pulley speed correction $\Delta NP_s$ may be corrected by multiplying the same by the correction coefficient $K_{vsw}$ ($\Delta NP_s \leftarrow \Delta NP_s \times K_{vsw}$), and the desired primary pulley speed NP read from the basic speed change characteristic map may be corrected by using the thus corrected desired primary pulley speed correction $\Delta NP_s$.

Although the invention has been described in its preferred embodiments with a certain degree of particularity, obviously many changes and variations are possible therein. It is therefore to be understood that the present invention may be practiced otherwise than as specifically described herein without departing from the scope and spirit thereof.

What is claimed is:

1. A controller for controlling a speed change ratio of a continuously variable transmission based on a basic speed change characteristic for flat road traveling, comprising:

vehicle traveling speed detector for detecting a vehicle traveling speed;

running resistance calculator for calculating a difference between a present running resistance applied to a vehicle and a running resistance applied to said vehicle during flat road traveling;

means for deciding whether said vehicle is traveling uphill based on said difference in running resistance;

desired traction setting means for setting a desired traction by adding a margin of traction corresponding to said difference in running resistance to a traction generated in throttle valve fully open state in the flat road traveling mode when said vehicle is in an uphill traveling mode;

achieved traction calculating means for calculating an achieved traction in the throttle valve fully open state at a present traveling speed when said vehicle is in said uphill traveling mode; and speed change characteristic correcting means for correcting said basic speed change characteristic toward a downshift side so that said achieved traction converges to said desired traction.

2. The controller according to claim 1, further comprising:

correction coefficient setting means for setting a correction coefficient based on at least said vehicle traveling speed; and correcting means for correcting said difference in running resistance with said correction coefficient.

3. The controller according to claim 2, wherein:

said correction coefficient reduces said difference in running resistance according to the increase of said vehicle traveling speed when a present vehicle traveling speed is a higher range than that of a predetermined vehicle traveling speed.

4. The controller according to claim 1, wherein:

said running resistance calculator stops an operation for setting said running resistance brakes are being applied and holds said incremental running resistance set in the preceding running resistance calculating cycle.

5. The controller according to claim 1, wherein:

said speed change characteristic correcting means holds a correction amount for said basic speed characteristic toward the downshift side in the preceding cycle if increasing of traction after the correction toward downshift side is small as compared with the traction for uphill traveling.

6. The controller according to claim 1, wherein:

said speed change characteristic correcting means holds a correction amount for said basic speed characteristic toward the downshift side in the preceding cycle if the value of a parameter indicating load on the engine during uphill traveling is less than a predetermined value.

7. The controller according to claim 1, wherein:

said speed change characteristic correcting means calculates a downshift correction amount for said achieved traction converging to said desired traction, and corrects a basic speed change characteristic map for storing said basic speed change characteristic with said downshift correction amount toward a downshift side.

8. The controller according to claim 1, wherein:

said speed change characteristic correcting means calculates a downshift correction amount for said achieved traction converging to said desired traction, and sets a desired primary pulley speed for the flat road traveling mode by reference to said basic speed change characteristic, and corrects said desired primary pulley speed with said downshift correction amount toward the downshift side, and sets a desired speed change ratio based on said corrected desired primary pulley speed.

9. A controller for controlling a speed change ratio of a continuously variable transmission based on a basic speed change characteristic for flat road traveling, comprising:

vehicle traveling speed detector for detecting a vehicle traveling speed;

running resistance calculator for calculating a difference between a present running resistance applied to a vehicle and a running resistance applied to said vehicle during flat road traveling;

means for deciding whether said vehicle is traveling downhill based on said difference in running resistance;

desired traction setting means for setting a desired traction indicative of a desired engine braking force by adding a margin of force corresponding to said difference in running resistance to an engine braking force generated in throttle valve fully closed state in the flat road traveling mode when said vehicle is in a downhill traveling mode;

achieved traction calculating means for calculating an achieved traction in the throttle valve fully closed state at a present traveling speed when said vehicle is in a downhill traveling mode; and speed change characteristic correcting means for correcting said basic speed change characteristic toward a downshift side so that said achieved traction converges to said desired traction.

10. The controller according to claim 9, further comprising:

correction coefficient setting means for setting a correction coefficient based on at least said vehicle traveling speed; and correcting means for correcting said difference in running resistance with said correction coefficient.

11. The controller according to claim 10, wherein:

said correction coefficient reduces said difference in running resistance according to the increase of said vehicle traveling speed when a present vehicle traveling speed is in a higher range than that of a predetermined vehicle traveling speed.

12. The controller according to claim 9, wherein:

said running resistance calculator stops an operation for setting said running resistance if brakes are being applied and holds said incremental running resistance set in the preceding running resistance calculating cycle.

13. The controller according to claim 9, wherein:

said speed change characteristic correcting means holds a correction amount for said basic speed characteristic toward the downshift side in the preceding cycle if increasing of traction after the correction toward the downshift side is small as compared with the traction for downhill traveling.

14. The controller according to claim 9, wherein:

said speed change characteristic correcting means holds a correction amount for said basic speed characteristic toward the downshift side in the preceding cycle if the value of a parameter indicating load on the engine during downhill traveling is less than a predetermined value.

15. The controller according to claim 9, wherein:
said speed change characteristic correcting means calculates a downshift correction amount for said achieved traction converging to said desired traction, and corrects a basic speed change characteristic map for storing said basic speed change characteristic with said downshift correction amount toward downshift side.

16. The controller according to claim 9, wherein:
said speed change characteristic correcting means calculates a downshift correction amount for said achieved traction converging to said desired traction, and sets a desired primary pulley speed for the flat road traveling mode by reference to said basic speed change characteristic, and corrects said desired primary pulley speed with said downshift correction amount toward the downshift side, and sets a desired speed change ratio based on said corrected desired primary pulley speed.

17. A controller for controlling a speed change ratio of a continuously variable transmission based on a basic speed change characteristic, comprising:
vehicle running condition detector for detecting a vehicle running condition including a vehicle traveling speed and a throttle opening angle;
running resistance calculator for calculating a difference between a present running resistance applied to a vehicle and a running resistance applied to the vehicle during flat road traveling;
correction coefficient setting means for setting a correction coefficient based on the vehicle traveling speed and said throttle opening angle, said correction coefficient setting means including
a first gain correction calculator for calculating a first gain based on said vehicle traveling speed and said throttle opening angle, and
a second gain correction calculator for calculating a second gain based on said vehicle traveling speed and said difference in running resistance, and
said correction coefficient being calculated based on at least one of said first and second gains and being used in correcting said difference in running resistance; and
speed change characteristic correcting means for correcting said speed change characteristic toward a downshift side based on said difference in running resistance.

18. The controller according to claim 17, wherein:
said correction coefficient setting means sets said correction coefficient when said vehicle traveling speed is in a higher range than that of a predetermined vehicle traveling speed.

19. The controller according to claim 18, wherein:
said correction coefficient reduces said difference in running resistance according to the increase of said traveling speed.

20. The controller according to claim 17, wherein:
said speed change characteristic correcting means corrects said speed change characteristic so as to obtain a traction set by adding a margin of traction corresponding to said difference in running resistance to a traction generated in the throttle valve fully open state in flat road traveling mode when said vehicle is in an uphill traveling mode.

21. The controller according to claim 17, wherein:
said speed change characteristic correcting means corrects said speed change characteristic so as to obtain a traction indicative of desired engine braking force set by adding a margin of force corresponding to said difference in running resistance to an engine braking force to an engine braking force generated in throttle valve fully closed state in flat road traveling mode when said vehicle is in a downhill traveling mode.

22. A controller for controlling a speed change ratio of a continuously variable transmission based on a basic speed change characteristic, comprising:
vehicle running condition detector for detecting a vehicle running condition including a vehicle traveling speed and a throttle opening angle;
running resistance calculator for calculating a difference between a present running resistance applied to a vehicle and a running resistance applied to the vehicle during flat road traveling;
correction coefficient setting means for setting a correction coefficient based on the vehicle traveling speed and said throttle opening angle, said correction coefficient setting means including
a first gain correction calculator for calculating a first gain based on said vehicle traveling speed and said throttle opening angle, and
a second gain correction calculator for calculating a second gain based on said vehicle traveling speed and said difference in running resistance, and
said correction coefficient being calculated based on at least one of said first and second gains and being used in correcting said difference in running resistance; and
speed change characteristic correcting means for calculating a downshift correction amount to correct said speed change characteristic based on said difference in running resistance, and for correcting a speed change characteristic toward a downshift side with said downshift correction amount corrected with said correction coefficient.

23. The controller according to claim 22, wherein:
said speed change characteristic correcting means sets said downshift correction amount so as to obtain a desired traction in the throttle valve fully open state at the current vehicle traveling speed,
said desired traction is set by adding a margin of traction corresponding to said difference in running resistance to a traction generated in the throttle valve fully open state in flat road traveling mode when said vehicle is in an uphill traveling mode.

24. The controller according to claim 22, wherein:
said speed change characteristic correcting means sets said downshift correction amount so as to obtain a desired traction indicative of desired engine breaking force in the throttle valve fully closed state at the current vehicle traveling speed,
said desired traction indicative of desired engine braking force is set by adding a margin of force corresponding to said difference in running resistance to an engine braking force generated in the throttle valve fully closed state in flat road traveling mode when said vehicle is in a downhill traveling mode.

25. The controller according to claim 22, wherein:
said correction coefficient setting means sets said correction coefficient to reduce said downshift correction amount at least when said vehicle traveling speed is in a higher range than that of a predetermined traveling speed.

26. The controller according to claim 25, wherein:

said correction coefficient reduces said downshift correction amount according to the increase of said vehicle traveling speed.

27. A controller for controlling a speed change ratio of a continuously variable transmission based on a basic speed change characteristic, comprising;

vehicle running condition detector for detecting a vehicle running condition including a vehicle traveling speed and a throttle opening angle;

desired primary pulley speed calculating means for calculating the desired primary pulley speed for the flat road traveling by reference to said basic speed change characteristic;

running resistance calculator for calculating a difference between a present running resistance applied to a vehicle and a running resistance applied to the vehicle during flat road traveling;

correction coefficient setting means for setting correction coefficient based on the vehicle traveling speed and said throttle opening angle, said correction coefficient setting means including a first gain correction calculator for calculating a first gain based on said vehicle traveling speed and said throttle opening angle, and a second gain correction calculator for calculating a second gain based on said vehicle traveling speed and said difference in running resistance, said correction coefficient being calculated based on at least one of said first and second gains and being used in correcting said difference in running resistance; and speed change characteristic correcting means for calculating a primary pulley correction amount to correct said desired primary pulley speed based on said difference in running resistance, and for correcting said desired primary pulley speed with said primary pulley correction amount corrected with said correction coefficient.

28. The controller according to claim 27, wherein:

said desired primary pulley speed is set by reference to said basic speed change characteristic for a throttle valve fully open state, said speed change characteristic correcting means sets said primary pulley correction amount so as to obtain a desired traction in the throttle valve fully open state at the current vehicle traveling speed, said desired traction is set by adding a margin of traction corresponding to said difference in running resistance to a traction generated in the throttle valve fully open state in flat road traveling mode when said vehicle is in an uphill traveling mode.

29. The controller according to claim 27, wherein:

said desired primary pulley speed is set by reference to said basic speed change characteristic in the throttle valve fully closed state, said speed change characteristic correcting means sets said primary pulley correction amount so as to obtain a desired traction indicative of desired engine braking force in the throttle valve fully closed state at the current vehicle traveling speed, said desired traction indicative of desired engine braking force is set by adding a margin of force corresponding to said difference in running resistance to an engine braking force generated in the throttle valve fully close state in flat road traveling mode when said vehicle is in a downhill traveling mode.

30. The controller according to claim 27, wherein:

said correction coefficient setting means sets said correction coefficient to reduce said primary pulley correction amount at least when said vehicle traveling speed is in a higher range than that of a predetermined traveling speed.

31. The controller according to claim 27, wherein:

said correction coefficient reduces said primary pulley correction amount according to the increase of said vehicle traveling speed.

32. A controller for controlling a speed change ratio of a continuously variable transmission based on a basic speed change characteristic, comprising:

vehicle running condition detector for detecting a vehicle running condition including a vehicle traveling speed;

running resistance calculator for calculating a difference of a present running resistance applied to a vehicle and a running resistance applied to the vehicle during flat road traveling;

correction coefficient setting means for setting a correction coefficient based on the vehicle traveling speed, said correction coefficient correcting said difference in running resistance;

speed change characteristic correcting means for correcting said speed change characteristic toward a downshift side based on said difference in running resistance corrected by said correction coefficient, and wherein said correction coefficient setting means sets said correction coefficient when said vehicle traveling speed is in a higher range than that of a predetermined vehicle traveling speed, and wherein said correction coefficient reduces said difference in running resistance according to the increase of said traveling speed.

* * * * *